US009565366B2

(12) United States Patent
Yamazaki et al.

(10) Patent No.: US 9,565,366 B2
(45) Date of Patent: Feb. 7, 2017

(54) ELECTRONIC DEVICE

(71) Applicant: Semiconductor Energy Laboratory Co., Ltd., Atsugi-shi, Kanagawa-ken (JP)

(72) Inventors: Shunpei Yamazaki, Tokyo (JP); Hideaki Shishido, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 14/616,827

(22) Filed: Feb. 9, 2015

(65) Prior Publication Data

US 2015/0229844 A1 Aug. 13, 2015

(30) Foreign Application Priority Data

Feb. 12, 2014 (JP) ................. 2014-024647

(51) Int. Cl.
| | |
|---|---|
| H04N 5/232 | (2006.01) |
| G09F 9/30 | (2006.01) |
| G06F 1/16 | (2006.01) |
| H04N 5/235 | (2006.01) |
| H04N 5/225 | (2006.01) |
| G03B 15/05 | (2006.01) |
| F21Y 105/00 | (2016.01) |

(52) U.S. Cl.
CPC .......... *H04N 5/23293* (2013.01); *G03B 15/05* (2013.01); *G06F 1/1652* (2013.01); *G09F 9/301* (2013.01); *H04N 5/2251* (2013.01); *H04N 5/2252* (2013.01); *H04N 5/2256* (2013.01); *H04N 5/2354* (2013.01); *F21Y 2105/00* (2013.01); *G03B 2215/0596* (2013.01); *G09G 2380/02* (2013.01)

(58) Field of Classification Search
CPC ..................... G06F 1/1652; G09G 2300/0491; G09G 2380/02; G09F 9/301; H01L 2251/5338; H01L 27/3244–27/327; H01L 27/3281–27/329; G02F 1/133305; H04N 5/23293

See application file for complete search history.

(56) References Cited

U.S. PATENT DOCUMENTS

| | | | |
|---|---|---|---|
| 6,372,608 B1 | 4/2002 | Shimoda et al. | |
| 6,828,727 B2 | 12/2004 | Yamazaki | |

(Continued)

FOREIGN PATENT DOCUMENTS

| | | |
|---|---|---|
| JP | 2003-174153 | 6/2003 |
| JP | 2004-279867 A | 10/2004 |

(Continued)

*Primary Examiner* — Paul Berardesca
(74) *Attorney, Agent, or Firm* — Fish & Richardson P.C.

(57) ABSTRACT

Provided is an electronic device with high portability, a highly browsable electronic device, or an electronic device having a novel light source that can be used in shooting photographs and video. The electronic device includes a camera and a flexible display portion. The display portion has a first region and a second region. The first region has a function of emitting light to a photographic subject. The second region has a function of displaying an image of the photographic subject shot by the camera. The display portion can be bent so that the first region and the second region face in different directions.

14 Claims, 15 Drawing Sheets

(56) References Cited

U.S. PATENT DOCUMENTS

| | | | |
|---|---|---|---|
| 7,027,110 B2 | 4/2006 | Akiyama et al. | |
| 7,242,445 B2 | 7/2007 | Akiyama et al. | |
| 8,367,440 B2 | 2/2013 | Takayama et al. | |
| 8,415,208 B2 | 4/2013 | Takayama et al. | |
| 8,550,907 B2 | 10/2013 | Yamazaki et al. | |
| 2001/0005454 A1* | 6/2001 | Nishino | H04M 1/0216 396/287 |
| 2002/0027636 A1 | 3/2002 | Yamada | |
| 2004/0183958 A1 | 9/2004 | Akiyama et al. | |
| 2006/0125973 A1 | 6/2006 | Akiyama et al. | |
| 2010/0064244 A1 | 3/2010 | Kilpatrick, II et al. | |
| 2010/0066643 A1 | 3/2010 | King et al. | |
| 2012/0217516 A1 | 8/2012 | Hatano et al. | |
| 2013/0214324 A1 | 8/2013 | Takayama et al. | |
| 2013/0222998 A1* | 8/2013 | Cho | G06F 1/1601 361/679.27 |
| 2013/0257688 A1 | 10/2013 | Yamazaki et al. | |
| 2013/0300313 A1 | 11/2013 | Yamazaki et al. | |
| 2014/0104762 A1* | 4/2014 | Park | G06F 1/1652 361/679.01 |
| 2014/0307144 A1* | 10/2014 | Jeong | H04N 5/232 348/333.06 |
| 2014/0347555 A1 | 11/2014 | Hirakata et al. | |
| 2015/0003034 A1 | 1/2015 | Nakamura et al. | |
| 2015/0016126 A1 | 1/2015 | Hirakata et al. | |
| 2015/0055118 A1 | 2/2015 | Yamazaki et al. | |
| 2015/0076475 A1 | 3/2015 | Hirakata | |
| 2015/0077615 A1 | 3/2015 | Yamazaki et al. | |
| 2015/0080051 A1 | 3/2015 | Yamazaki et al. | |
| 2015/0146069 A1 | 5/2015 | Yamazaki et al. | |
| 2015/0146387 A1* | 5/2015 | Lee | G06F 1/1652 361/749 |
| 2016/0155783 A1 | 6/2016 | Hirakata | |
| 2016/0174313 A1 | 6/2016 | Nakamura et al. | |
| 2016/0227087 A1 | 8/2016 | Hirakata et al. | |

FOREIGN PATENT DOCUMENTS

| | | |
|---|---|---|
| JP | 2005-114759 A | 4/2005 |
| JP | 2008-293680 A | 12/2008 |
| JP | 2010-099122 A | 5/2010 |
| WO | WO-01/53919 | 7/2001 |

* cited by examiner

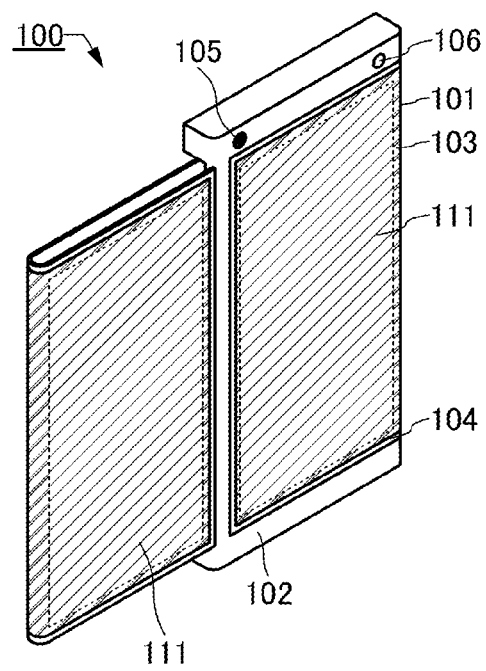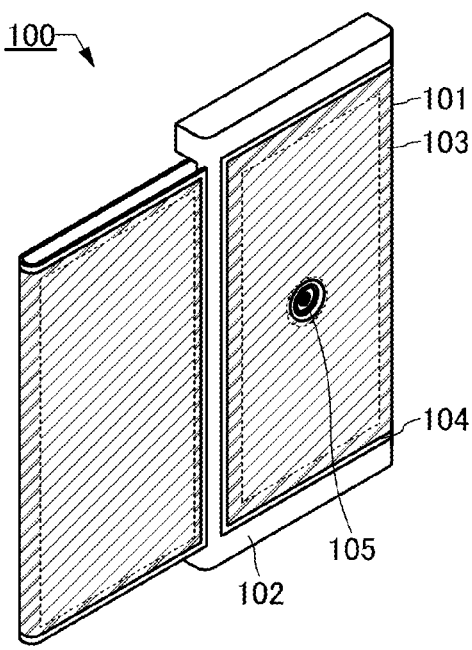

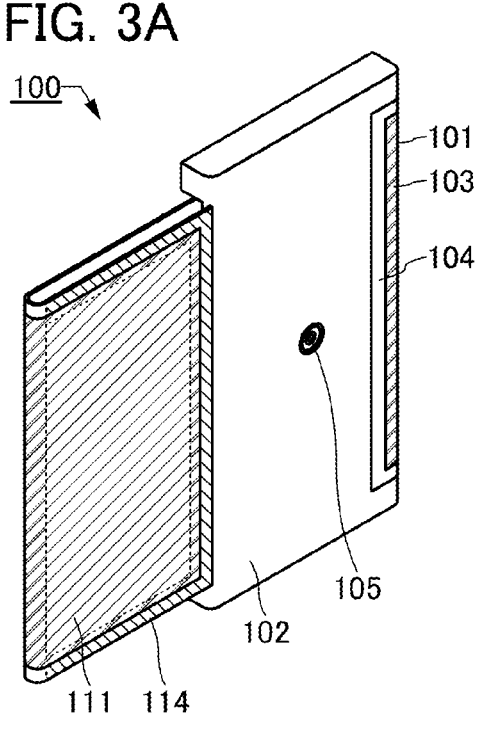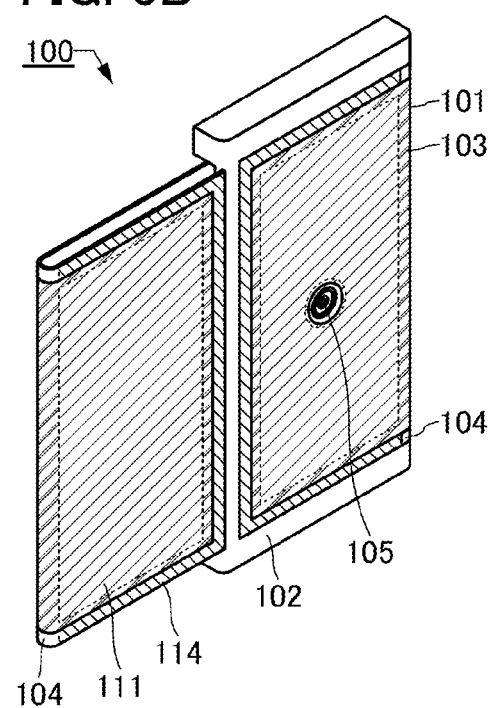

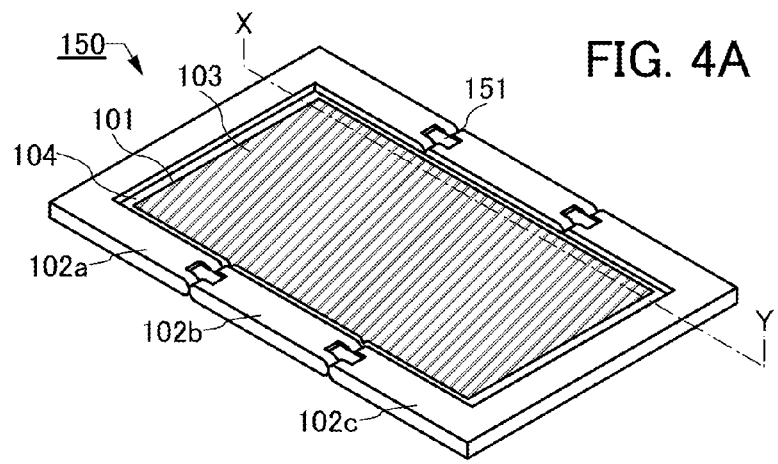
FIG. 4A
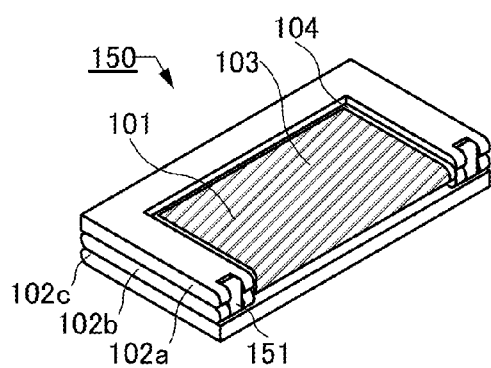
FIG. 4B
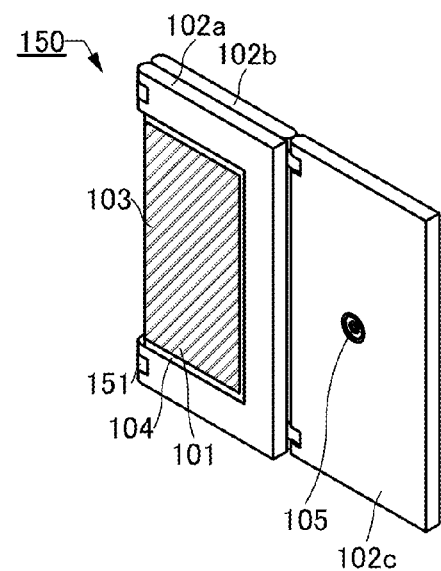
FIG. 4C
FIG. 4D
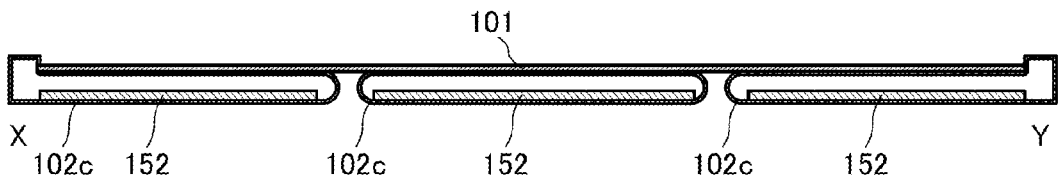

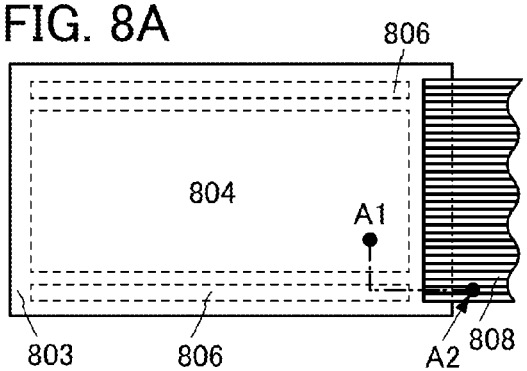
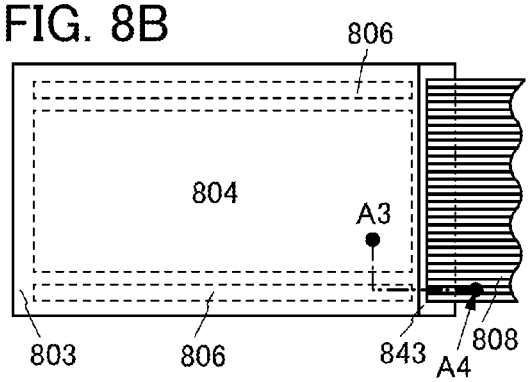
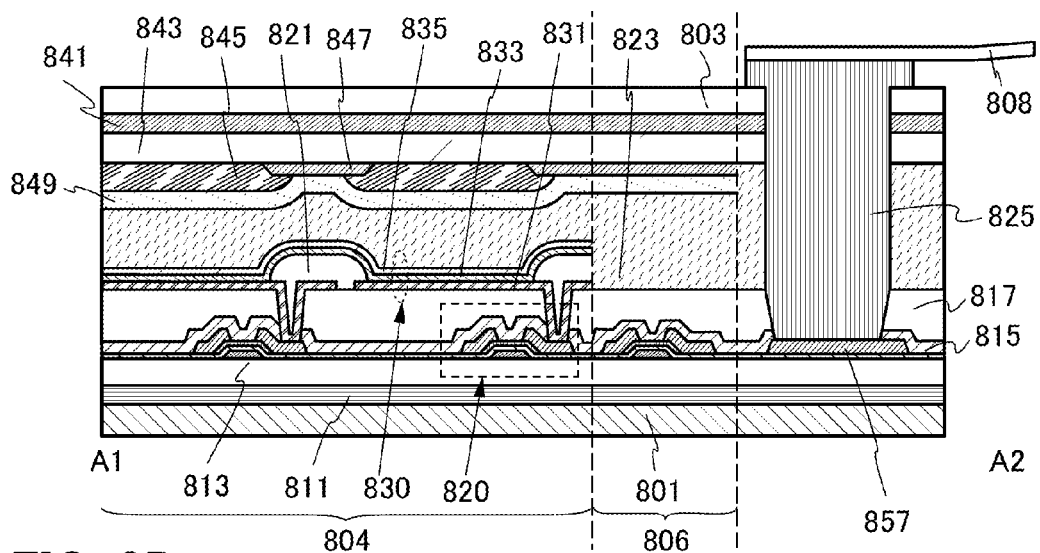
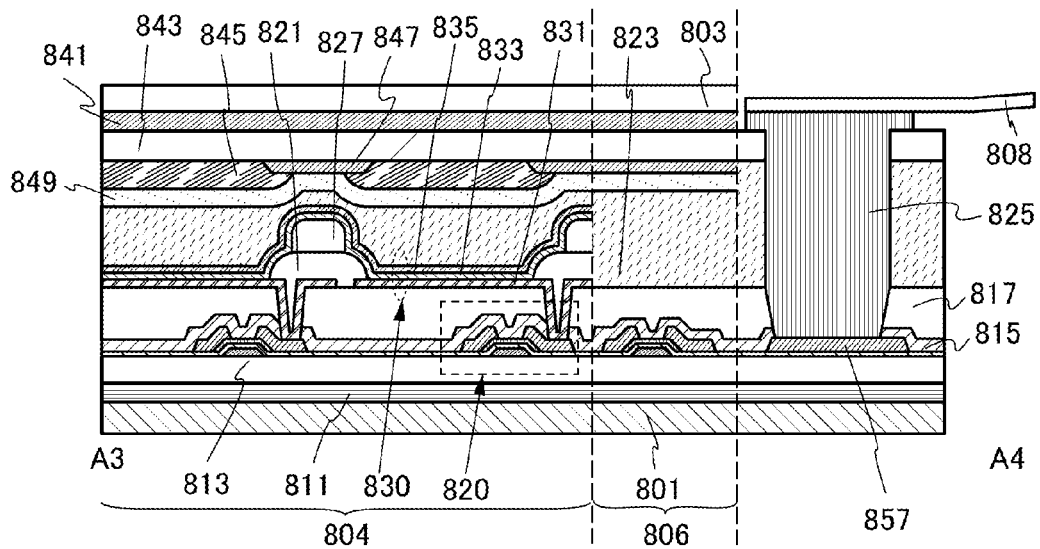

505

ELECTRONIC DEVICE

BACKGROUND OF THE INVENTION

1. Field of the Invention

One embodiment of the present invention relates to a display device, and particularly to a flexible and bendable display device. Furthermore, one embodiment of the present invention relates to an electronic device including a display device.

One embodiment of the present invention is not limited to the above technical field. The technical field of one embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the present invention disclosed in this specification include a semiconductor device, a display device, a light-emitting device, a lighting device, a power storage device, a memory device, a method for driving any of them, and a method for manufacturing any of them.

2. Description of the Related Art

Recent display devices are expected to be applied to a variety of uses and become diversified. For example, display devices for portable electronic devices and the like are required to be thin, light, and robust. In addition, novel application is required.

Patent Document 1 discloses a flexible active matrix light-emitting device in which an organic EL element and a transistor serving as a switching element are provided over a film substrate.

REFERENCE

Patent Document

[Patent Document 1] Japanese Published Patent Application No. 2003-174153

SUMMARY OF THE INVENTION

In recent years, browsability of display has been considered to be improved by enlarging display regions of display devices to display a larger amount of data. However, in applications of portable devices and the like, an enlargement of display regions might entail a reduction in portability. For this reason, browsability of display and portability are difficult to improve at the same time.

Electronic devices such as portable information terminals are desired to mount cameras so that users can shoot photographs and video without circumstance. In addition, light sources for illuminating subjects are required to have high luminance with low power consumption.

An object of one embodiment of the present invention is to provide an electronic device with high portability. Another object is to provide a highly browsable electronic device. Another object is to provide an electronic device having a novel light source that can be used in shooting photographs and video. Another object is to provide a novel display device, lighting device, or electronic device.

Note that the descriptions of these objects do not disturb the existence of other objects. In one embodiment of the present invention, there is no need to achieve all the objects. Other objects will be apparent from and can be derived from the descriptions of the specification and the like.

One embodiment of the present invention is an electronic device including a camera and a flexible display portion. The display portion has a first region and a second region. The first region has a function of emitting light to a photographic subject. The second region has a function of displaying an image of the photographic subject shot by the camera. The display portion can be bent so that the first region and the second region face in different directions.

Another embodiment of the present invention is an electronic device including a housing, a camera, and a flexible display portion. The display portion has a region fixed to a first face of the housing. The camera has a region fixed to a second face of the housing. The display portion has a first region and a second region. The first region has a function of emitting light to a photographic subject. The second region has a function of displaying an image of the photographic subject shot by the camera. The display portion can be bent so that the first region and the second region face in different directions.

It is preferred that the housing have a third face, the third face have a region in contact with the first face, and the display portion have a region along the third face. The housing preferably has a concave portion. The display portion can be folded to fit in the concave portion.

The display portion preferably includes a first pixel and a second pixel. The first pixel preferably includes a first light-emitting element. The second pixel preferably includes a second light-emitting element. A third light-emitting element is preferably provided between the first pixel and the second pixel. It is preferable that the first pixel and the second pixel each have a function of being controlled by active matrix driving whereas the third light-emitting element have a function of being controlled by passive matrix driving.

The display portion preferably includes a third region and a fourth region. The third region preferably has the first region and the second region. The fourth region preferably has a region along an edge of the third region and preferably includes a fourth light-emitting element. The display portion preferably includes a circuit and a wiring. The fourth light-emitting element preferably has a region overlapping with one or both of the circuit and the wiring. It is preferable that the third region have a function of being controlled by active matrix driving whereas the fourth region have a function of being controlled by passive matrix driving.

In one embodiment of the present invention, an electronic device with high portability, a highly browsable electronic device, or an electronic device having a novel light source that can be used in shooting photographs and video can be provided.

BRIEF DESCRIPTION OF THE DRAWINGS

FIGS. 2A and 2B each illustrate an example of an electronic device of an embodiment.

FIGS. 3A and 3B each illustrate an example of an electronic device of an embodiment.

FIGS. 4A to 4D illustrate an example of an electronic device of an embodiment.

FIGS. 8A to 8D each illustrate an example of a light-emitting panel of an embodiment.

DETAILED DESCRIPTION OF THE INVENTION

Figure 1A:
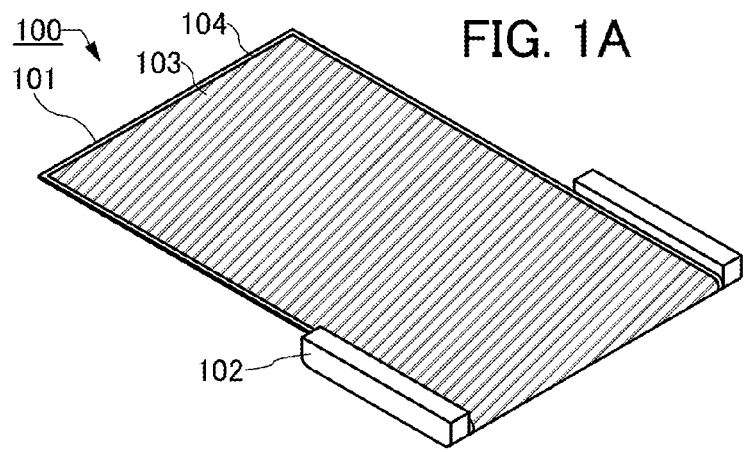
FIGS. 1A to 1E illustrate an example of an electronic device of an embodiment.

Embodiments will be described in detail with reference to the accompanying drawings. Note that the present invention is not limited to the description below, and it is easily understood by those skilled in the art that various changes and modifications can be made without departing from the spirit and scope of the present invention. Therefore, the present invention should not be construed as being limited to the description in the following embodiments.

Note that in the structures of the invention described below, the same portions or portions having similar functions are denoted by the same reference numerals in different drawings, and description of such portions is not repeated. The same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, the scale is not necessarily limited to that illustrated in the drawings and the like.

In this specification and the like, ordinal numbers such as "first" and "second" are used in order to avoid confusion among components and do not limit the components numerically.

(Embodiment 1)

In this embodiment, structure examples of the electronic device of one embodiment of the present invention will be described.

[Structure Example of Electronic Device]

Figure 1B:
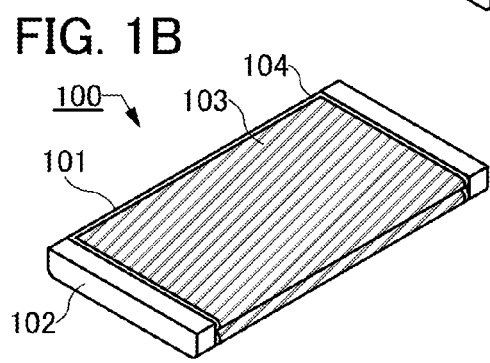
Figure 1C:
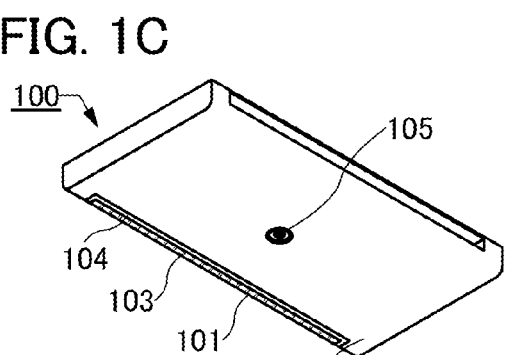
Figure 1D:
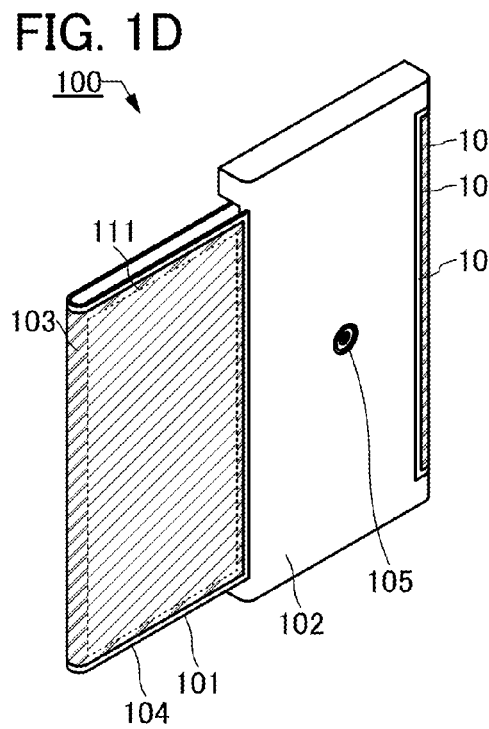
Figure 1E:
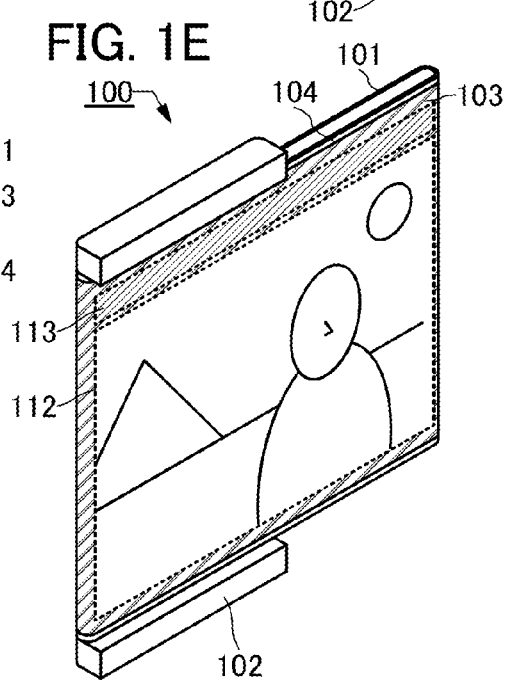

FIGS. 1A to 1E illustrate an electronic device 100 described below as an example. FIG. 1A illustrates the electronic device 100 with a display portion 101 opened. FIGS. 1B and 1C illustrate the electronic device 100 with the display portion 101 folded. FIGS. 1D and 1E each illustrate an example of the electronic device 100 in use.

The electronic device 100 includes the display portion 101 and a housing 102.

The display portion 101 is flexible. The display portion 101 is fixed to the housing 102 at a region in contact with the housing 102. The display portion 101 includes a display region 103 that displays an image and a non-display region 104 that surrounds the display region 103.

A camera 105 is provided on a face of the housing 102. In FIGS. 1A to 1E, the camera 105 is provided on a face of the housing 102 opposite to a face to which the display portion 101 is fixed.

In the electronic device 100 of one embodiment of the present invention, the flexible display portion 101 is partly supported by the housing 102. The display portion 101 can change its form by bending or the like. For example, the display portion 101 can be bent so that a display surface faces inward (bent inward) or can be bent so that the display surface faces outward (bent outward). Note that the display surface of the display portion is a surface on which an image is displayed. The display portion 101 can also be folded. The electronic device 100 of one embodiment of the present invention has high portability with the display portion 101 folded, and has high browsability in display with the display portion 101 opened because the display portion 101 can be a seamless large display region.

The housing 102 has a concave portion. The folded display portion 101 can fit in the concave portion. Such a concave portion enables the display portion 101 to prevent or reduce protrusions from the housing 102 when folded, which is preferable because the display portion 101 can be prevented from being damaged in carrying the electronic device 100 in a pocket of clothes or a bag, for example.

To use the electronic device 100 of one embodiment of the present invention, the display portion 101 may be opened so that the entire display region 103 can be used as a seamless large display region, or the display region 103 may be bent so that the display surface of the display portion 101 faces outward and part of the display region 103 can be used. When the display surface of the display portion 101 is bent inward, part of the display region 103 that is hidden from a user is put in a non-display state, leading to a reduction in power consumption of the display portion 101.

The display region 103 of the display portion 101 preferably has a predetermined aspect ratio, e.g., 16:9 in an opened state. In addition, the folded display portion 101 (e.g., in the state illustrated in FIG. 1B) preferably has an aspect ratio that is close to that of the opened display portion 101. This means that, the aspect ratio of an image can be substantially the same in either an opened or a folded state. As a result, in the case where the same image is displayed on the display region 103 in the opened and folded states by zooming in or out, the image can be displayed on the entire viewed portion of the display region 103 almost without leaving an unnatural margin or creating an image distortion caused when the magnification ratios of the width and the height are different from each other.

The display portion 101 is preferably provided on two or more surfaces of the housing 102. In FIGS. 1A to 1E, the display portion 101 is provided along one side surface of the housing 102. In such a case, one image may be displayed on the entire display region 103 including a portion provided on the side surface of the housing 102. Part of the display region 103 provided on the side surface of the housing 102 can display various information, for example, notification of an incoming call, an e-mail, a social networking service (SNS) massage, or the like; an title or a sender of an e-mail, an SNS massage, or the like; the date; the time; remaining battery; and the reception strength of an antenna. Alternatively, an image having a function as an operation button, an icon, a slider, or the like may be displayed.

FIGS. 1D and 1E illustrate the case of shooting with the camera 105.

Note that part of the display region 103 of the display portion 101 can be used as a region 111 that functions as a light source for shooting. As illustrated in FIGS. 1D and 1E, part of the display portion 101 is folded back so as to face in the shooting direction of the camera 105 and light is emitted from the region 111, so that a subject can be illuminated brightly.

The region 111 functions as a planar light source and thus produces an effect of blurring the shading of a subject which is made at the time of shooting. The shading might be emphasized too much when a point light source such as an LED or a flash lamp is used; in contrast, a soft image can be shot with the use of light emitted from the region 111.

In addition, power consumption can be extremely low as compared to the case of using a xenon light source or the like as a light source for illuminating a subject. Accordingly, an extra battery that is necessary when a xenon light source or the like is used is not needed. It is preferable that the size of the region 111 can be freely changed by a user. As the area of the region 111 increases, power consumed to emit light can be reduced without lowering luminance.

In the case where the region 111 is used as a light source, the entire region 111 may display the same color, e.g., white. Alternatively, white with a color temperature of 2000 K to 8000 K may be displayed, so that color temperatures such as an incandescent color, neutral white, and a daylight color can be displayed. Since the region 111 is part of the display portion 101, light with a variety of colors can be used for a light source. The region 111 may display a single color other than white, such as red, blue, green, or yellow.

Alternatively, the region 111 may be divided into two or more portions so that different colors can be displayed. Further alternatively, the region 111 may display colors that gradually change (gradation).

The region 111 may emit light at the timing of shooting or for a certain period. It is preferable that light be emitted all the time while video is shot.

As illustrated in FIG. 1E, a region 112 in part that is not folded back of the display region 103 can display a shot image. The shot image is preferably displayed on the region 112 so as to have a predetermined aspect ratio, e.g., 4:3. A user can shoot while seeing an image displayed on the region 112. At the same time, the user can adjust the strength of light emitted from the region 111 and the area of the region 111.

A region 113 in the display region 103 can display data on a photograph or video. The region 113 may be positioned above, below, on the right, or on the left of the region 112, as long as it is near the region 112. The region 113 may be divided into two or more portions. The region 113 may overlap with the region 112. The data that can be displayed on the region 113 includes the aperture, the shutter speed, the ISO sensitivity, the focal length, setting data of exposure compensation or a filter, the image quality, resolution, size, and number of gray scales of a shot image, and the selected shooting mode (e.g., a macro mode, a nightscape mode, a backlight mode, or an auto mode).

[Other Examples of Electronic Device]

In FIGS. 1A to 1E, the display portion 101 is also provided on the side surface of the housing 102; the display portion 101 may also be provided on a face of the housing 102 on which the camera 105 is provided.

FIG. 2A illustrates an example where the display portion 101 is also provided on the back of the housing 102 (the side on which the camera 105 is provided). In that case, part of a region of the display portion 101, which is provided along the back of the housing 102, is preferably used as the region 111. In addition to the folded back portion of the display portion 101, the region provided along the back of the housing 102 is used as a light source for shooting, whereby the emission luminance of light can be increased. Moreover, an increase in the area of the region 111 can enhance the effect of blurring the shading of a subject.

As illustrated in FIG. 2A, the housing 102 may be additionally provided with a light source 106, e.g., an LED. With such a structure, the light sources can be used as appropriate depending on the usage.

As illustrated in FIG. 2B, the region of the display portion 101 provided along the back of the housing 102 may be provided with an opening portion in a region overlapping with the camera 105. As a result, the region 111 surrounds the camera 105, in which case a subject can be favorably illuminated even when the subject is very close to the camera 105, for example.

FIGS. 3A and 3B each illustrate a structure in which a light-emitting region 114 functioning as a light source for shooting is provided in part of the non-display region 104 that surrounds the display region 103 of the display portion 101. The light-emitting region 114 is provided along an edge of the display region 103.

The light-emitting region 114 may partly or entirely overlap with the non-display region 104. In the case where part of the display portion 101 is also provided on the back of the housing 102 as illustrated in FIG. 3B, the non-display region 104 provided along the back of the housing 102 may be provided with the light-emitting region 114 partly or entirely.

The light-emitting region 114 includes a light-emitting element. The light-emitting element is preferably formed in the same process as a light-emitting element included in the display region 103. The light-emitting region 114 preferably overlaps with a circuit for driving a plurality of pixels included in the display region 103 or a wiring electrically connected to the plurality of pixels and the circuit.

The light-emitting region 114 preferably includes a plurality of light-emitting elements that can individually emit light. It is further preferable that each of the light-emitting elements be controlled by passive matrix driving. Note that one light-emitting element may be provided over the light-emitting region 114; however, it is preferable that a plurality of light-emitting elements be provided and their light emission be individually controlled because light can be emitted only from a region that faces in the shooting direction of the camera 105.

The plurality of pixels included in the display region 103 and the light-emitting elements included in the light-emitting region 114 are preferably controlled by active matrix driving and passive matrix driving, respectively. With the use of different driving methods in such a manner, supply of a power supply potential used for driving the light-emitting region 114 can be interrupted when shooting is not performed, reducing power consumption. In addition, when shooting is performed, the display quality of an image (e.g., a shot image) displayed on the display region 103 can be improved. The light-emitting region 114 is driven when necessary; for example, when the amount of light emitted from the region 111 is sufficient for shooting, the light-emitting region 114 is not necessarily driven.

Note that voltage necessary for the light-emitting element in the light-emitting region 114 to emit light may be different from that for a light-emitting element included in the pixel in the display region 103. When voltage necessary for the light-emitting element in the light-emitting region 114 to emit light is set higher, for example, the luminance of light emitted from the light-emitting region 114 can be higher than that of light emitted from the region 111. If these light-emitting elements emit light at the same time, a subject can be irradiated with light with high luminance.

Note that electronic components, for example, a battery, a printed circuit board on which a variety of ICs such as an arithmetic unit and a driver circuit are mounted, a wireless receiver, a wireless transmitter, a wireless power receiver, and a variety of sensors such as an acceleration sensor are incorporated as appropriate into the housing 102, so that the electronic device 100 can function as a portable terminal, a portable image reproducing device, a portable lighting device, or the like. A camera, a speaker, a variety of input/output terminals such as a terminal for power supply, a variety of sensors such as an optical sensor, an operation button, or the like may also be incorporated into the housing 102.

Note that although the above-described electronic device 100 has one housing 102, two or more housings may be provided. FIGS. 4A to 4D illustrate a structure example of an electronic device 150 having three housings.

FIG. 4A illustrates the electronic device 150 in an opened state. FIG. 4B illustrates the electronic device 150 in a folded state. FIG. 4C illustrates the case where part of the display portion 101 faces in the shooting direction of the camera 105. FIG. 4D is a schematic cross-sectional view taken along line X-Y in FIG. 4A.

The electronic device 150 has three housings (housings 102a, 102b, and 102c) that hold the display portion 101. A hinge 151 is provided between two housings. The display portion 101 can be bent inward or outward at the hinge 151.

The electronic components listed above can be incorporated into at least one of the housings 102a to 102c. In that case, the electronic components may be collectively incorporated into one of the housings, or may be incorporated into a plurality of housings and the electronic components in the housings may be electrically connected to each other by a wiring or the like which connects the housings through the hinge 151. When the electronic components are incorporated into a plurality of housings, each housing can be thin.

As illustrated in FIG. 4D, each of the housings preferably includes a battery 152 so that the electronic device 150 can be used for a long time. When each of the housings is provided with the small battery 152 having a predetermined capacity, the physical thickness of each of the batteries 152 can be reduced, leading to a reduction in the thickness of the electronic device 150. A laminated power storage device, e.g., a laminated lithium ion battery, can be used as the battery 152, whereby the thickness of the battery 152 can be reduced.

Figure 5A:
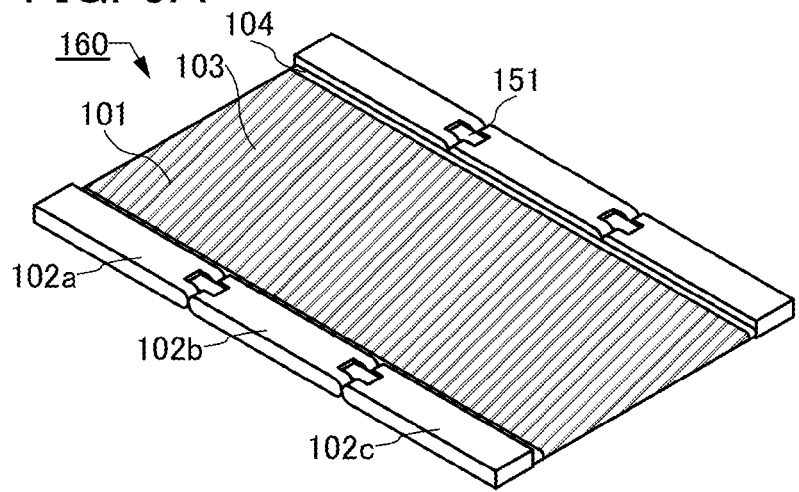
FIGS. 5A to 5C illustrate an example of an electronic device of an embodiment.
Figure 5B:
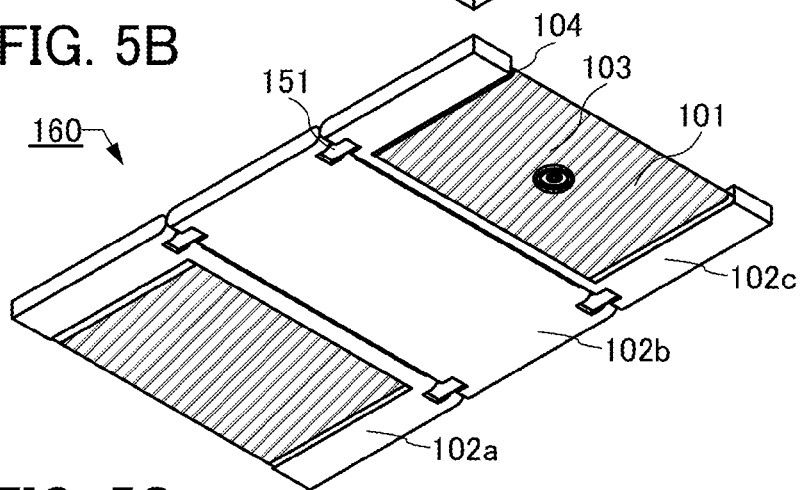
Figure 5C:
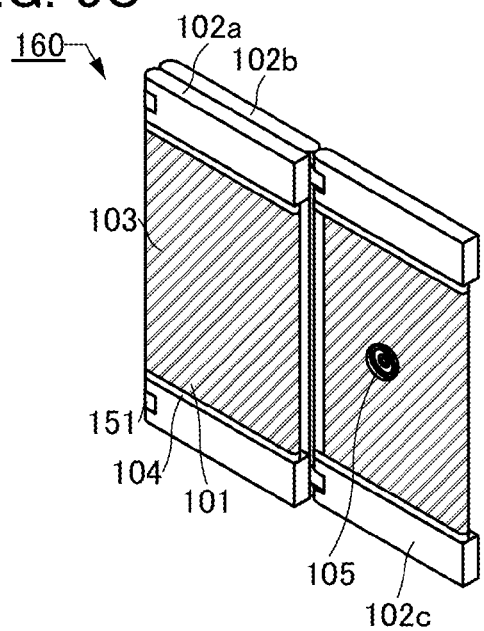

In an electronic device 160 illustrated as an example in FIGS. 5A to 5C, the display portion 101 is also provided on side and back surfaces of two housings at the ends (the housings 102a and 102c). On the back of the housing 102c, the camera 105 is provided at the position overlapping with an opening of the display portion 101.

Even in the case where the electronic device 160 includes a plurality of housings, the display portion 101 is provided along two or more surfaces of a housing as described above; accordingly, display can be performed on two or more surfaces of the housing even when the electronic device 160 is folded.

Although a structure including three housings is described here, the number of housings is not limited to three; a structure including two housings or four or more housings may be used. The camera 105 is provided on one surface of at least one of a plurality of housings.

Although the thicknesses of the plurality of housings are almost the same in the above drawings, the thickness of each housing may be different. It is preferable that the thicknesses of two or more housings, preferably the thicknesses of all the housings be almost the same, in which case horizontality of a light-emitting surface of the opened electronic device can be maintained easily. Among the plurality of housings, one incorporating all or most of the above electronic components can be used as a main body having a relatively large thickness, and the other housing(s) can be used as a member having a smaller thickness to simply support the display portion 101.

[Structure Example of Display Portion]

Figure 6A:
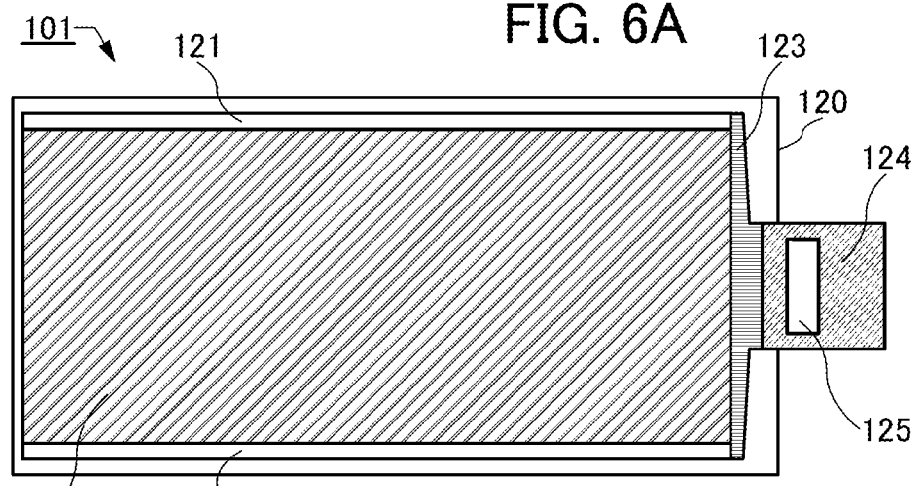
FIGS. 6A to 6C each illustrate an example of a display portion of an embodiment.

FIG. 6A is a schematic top view of the display portion 101. The display portion 101 includes, over a flexible substrate 120, the display region 103, a circuit 121, a circuit 122, and a plurality of wirings 123. An FPC 124 electrically connected to the plurality of wirings 123 is attached to the substrate 120. The FPC 124 is provided with an IC 125.

The display region 103 includes a plurality of pixels. Each of the pixels in the display region 103 preferably includes at least one display element. Typical examples of the display element include a liquid crystal element and a light-emitting element such as an organic EL element.

The circuits 121 and 122 each have a function of driving the pixels in the display region 103. The circuits 121 and 122 each can function as a gate driver circuit, for example. Although two circuits are provided with the display region 103 sandwiched therebetween here, the number of the circuits can be one. In the case where a signal is supplied to the pixels through the FPC 124, the circuits 121 and 122 are not necessary.

The plurality of wirings 123 are electrically connected to the circuit 121, the circuit 122, or the pixels in the display region 103. Furthermore, some of the plurality of wirings 123 are electrically connected to a terminal that are connected to the FPC 124.

In FIG. 6A, the IC 125 is mounted on the FPC 124 by a COF method or the like. The IC 125 can function as, for example, a source driver circuit. Alternatively, the IC 125 may have a function of correcting an image signal supplied to the display region 103, for example. Note that in the case where a circuit that can function as a source driver circuit is provided over the flexible substrate 120 or provided outside, the IC 125 is not necessary. When the display portion 101 includes a large number of pixels, a plurality of the FPCs 124 may be provided.

Note that it is preferable that, in the case where the pixels in the display region 103 include light-emitting elements, a potential supplied to the pixels when the display region 103 displays an image be different from that when the display region 103 functions as a light source for shooting. In that case, current flowing in the light-emitting elements can be larger when the display region 103 functions as a light source for shooting than when the display region 103 displays an image, leading to an increase in the luminance of light emitted from the light-emitting elements. When the display region 103 is used as the region 111 that functions as a light source for shooting, for example, a potential higher (or lower) than a potential used for displaying an image is supplied to both a wiring serving as a gate line electrically connected to the pixels and a wiring serving as a signal line.

For this reason, each of the circuits 121 and 122 that can function as a gate driver circuit is preferably configured to supply two or more potentials to the pixels. For example, it is possible that two different power lines are provided and a potential of one of the power lines is supplied to the pixels. Furthermore, an output signal is preferably set to be two or more potentials and the IC 125 that can function as a source driver circuit is preferably configured to supply one of the potentials to the pixels. For example, the IC 125 may include a level shifter circuit and have a configuration with which an output potential (amplitude) of the level shifter circuit can be changed.

Figure 6B:
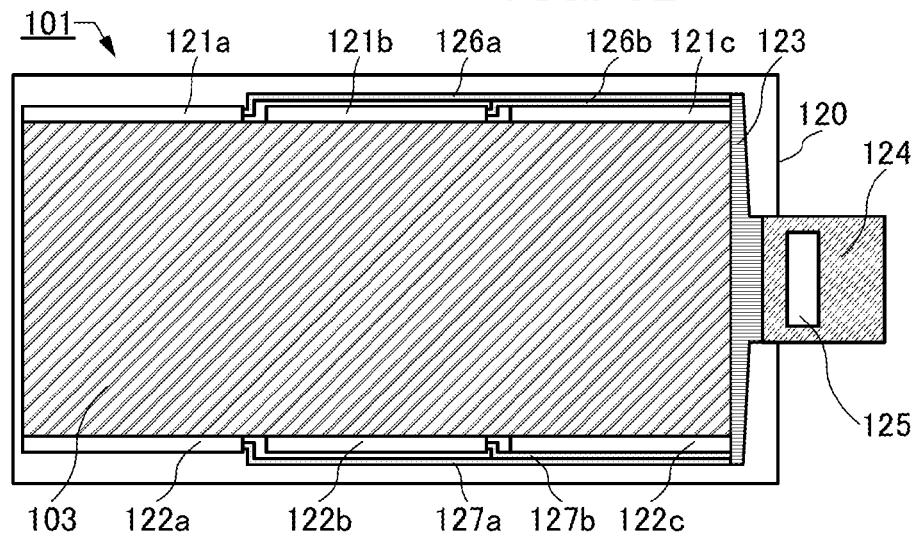

The circuits 121 and 122 may be divided into a plurality of parts and each part may be driven independently. FIG. 6B illustrates the case where the circuit 121 is divided into three parts (circuits 121a, 121b, and 121c) and the circuit 122 is divided into three parts (circuits 122a, 122b, and 122c). FIG. 6B also illustrates a plurality of wirings 126a electrically connected to the circuit 121a, a plurality of wirings 126b electrically connected to the circuit 121b, a plurality of wirings 127a electrically connected to the circuit 122a, and a plurality of wirings 127b electrically connected to the circuit 122b.

When a circuit that can function as a gate driver circuit is divided into a plurality of parts, part of the display region 103 which is hidden when the display portion 101 is folded can be easily controlled so as not to be driven. In addition, supply of a power supply potential to the circuit can be easily interrupted. As a result, power consumption of the display portion 101 can be extremely low.

Moreover, when a circuit that can function as a gate driver circuit is divided into a plurality of parts and each part is driven independently, different potentials can be easily supplied to the display region 103 depending on regions. In that case, an image can be easily displayed on the part of the display region 103 and the other region can be easily used as the region 111 serving as a light source for shooting. In the structure illustrated in FIG. 6B, for example, when a power supply potential supplied to the circuits 121a and 122a is higher (or lower) than a power supply potential supplied to the circuits 121b, 122b, 121c, and 122c, the luminance of light emitted from pixels electrically connected to the circuits 121a and 122a can be higher than that from the other pixels.

Figure 6C:
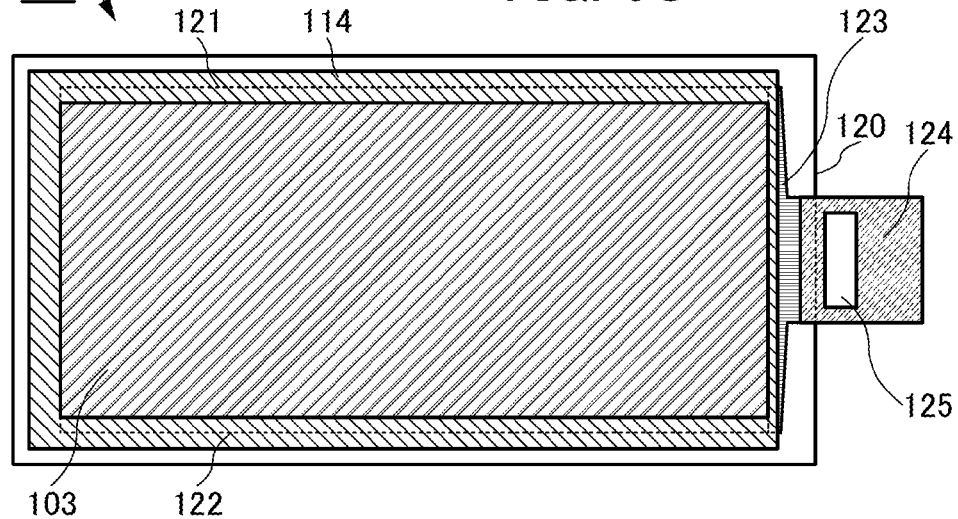

In FIG. 6C, the light-emitting region 114 that has a function as a light source for shooting is provided so as to overlap with the circuits 121 and 122 and the plurality of wirings 123. When the light-emitting region 114 is provided so as to overlap with the circuits or the wirings positioned around the display region 103 as described above, the area of a non-display region of the display portion 101 can be reduced.

[Structure Example of Display Region]

An example where the display region 103 includes a plurality of pixels for displaying an image and light-emitting elements between the pixels will be described below.

Figure 7A:
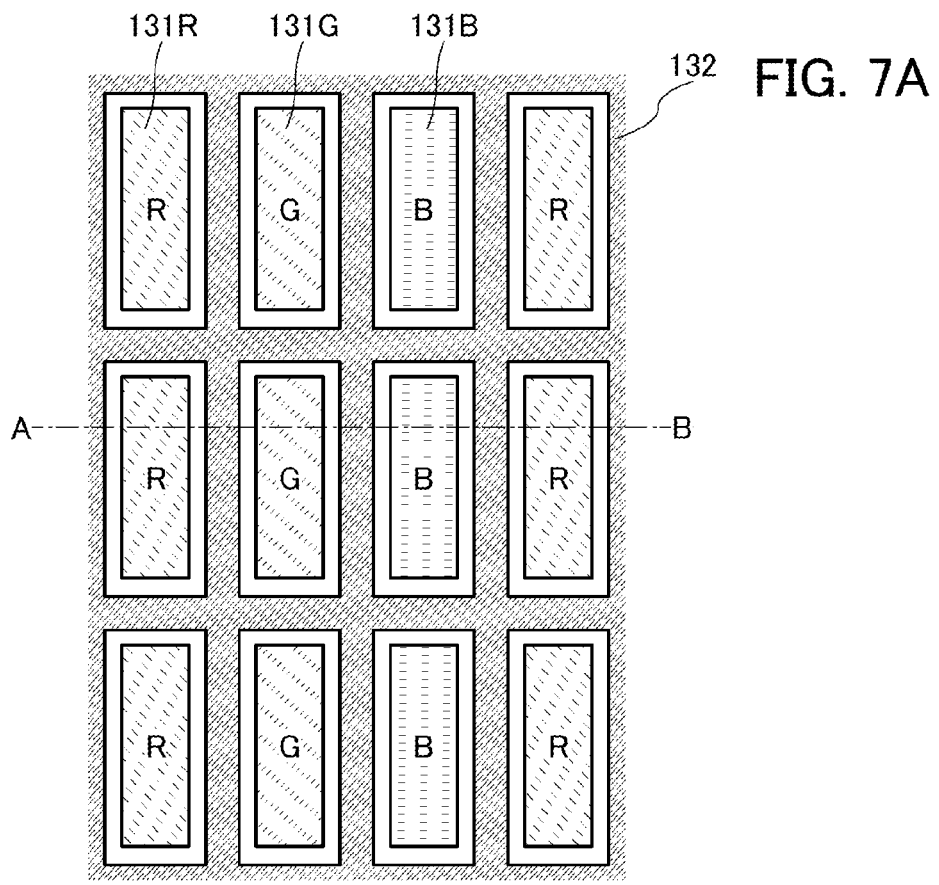
FIGS. 7A to 7C each illustrate an example of an electronic device of an embodiment.

FIG. 7A is a schematic top view showing a pattern of pixel electrodes in the pixels included in the display region 103. Described here is the case where the display region 103 includes three kinds of pixels of red (R), green (G), and blue (B).

A pixel that emits red light includes a pixel electrode 131R. A pixel that emits green light includes a pixel electrode 131G. A pixel that emits blue light includes a pixel electrode 131B.

An electrode 132 is provided between adjacent pixels. The electrode 132 is arranged in a grid and is electrically isolated from each pixel electrode.

Figure 7B:
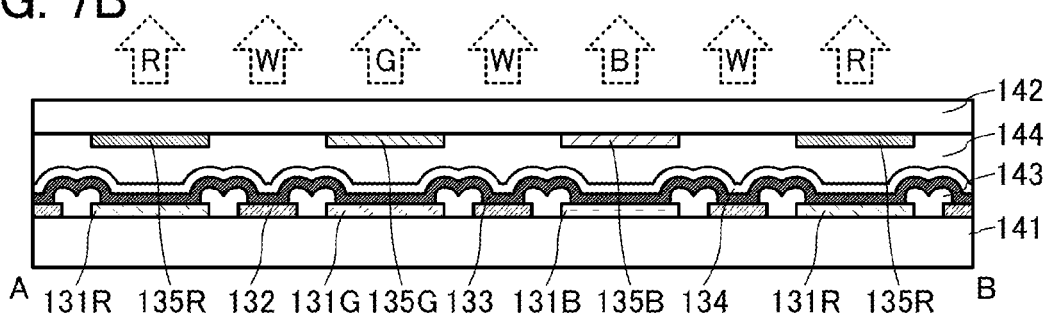

FIG. 7B is a schematic cross-sectional view of the display portion 101 taken along ling A-B in FIG. 7A. FIG. 7B illustrates, as an example, a cross section of top-emission light-emitting elements to which white organic EL elements are applied and its vicinity. Note that a specific structure example will be described later.

Each pixel electrode and the electrode 132 are provided over an insulating layer 141. An insulating layer 143 is provided to cover end portions of each pixel electrode and the electrode 132. Furthermore, a layer containing a light-emitting organic compound (the layer is hereinafter referred to as an EL layer 133) is provided to cover each pixel electrode, the electrode 132, and the insulating layer 143. In addition, an electrode 134 is provided to cover the EL layer 133.

A substrate 142 adhered to the insulating layer 141 with a sealant 144 is also provided. Note that color filters 135R, 135G, and 135B are provided on one surface of the substrate 142. The color filter 135R that transmits red light is provided so as to overlap with the pixel electrode 131R. The color filter 135G that transmits green light is provided so as to overlap with the pixel electrode 131G. The color filter 135B that transmits blue light is provided so as to overlap with the pixel electrode 131B. A color filter is not provided in a region overlapping with the electrode 132.

Figure 7C:
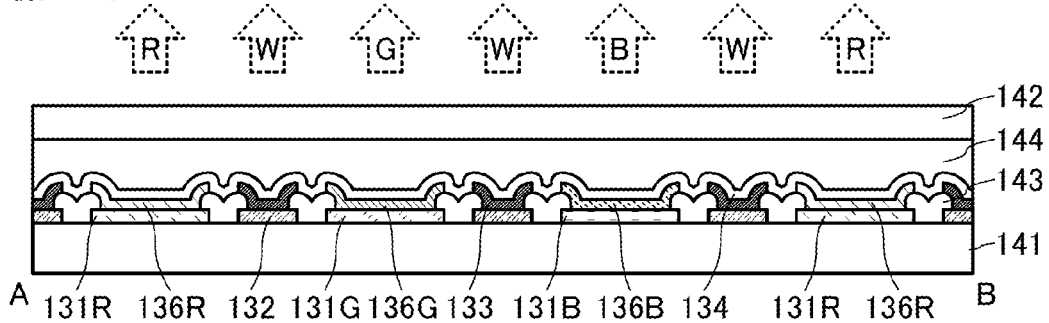

FIG. 7C illustrates the case of using light-emitting elements formed by a separate coloring method. An EL layer 136R that emits red light, an EL layer 136G that emits green light, and an EL layer 136B that emits blue light are provided over the pixel electrode 131R, the pixel electrode 131G, and the pixel electrode 131B, respectively. In addition, the EL layer 133 that emits white light is provided over the electrode 132.

Although a color filter is not provided on the substrate 142 here, color filters may be provided in regions overlapping with the pixel electrodes as illustrated in FIG. 7B.

With such structures, the display region 103 can display a full-color image. Moreover, white light (W) emitted from the light-emitting elements including the electrode 132, the EL layer 133, and the electrode 134 can be used for a light source for shooting.

In the case where the display region 103 includes a plurality of the electrodes 132, light emission from the light-emitting elements including the electrodes can be easily controlled individually. The light-emitting elements including the electrode 132 are preferably controlled by passive matrix driving, for example, because an additional transistor or the like for driving the light-emitting elements is not needed.

The above is the description of the display region.

Note that an example in which the light-emitting elements are used as display elements is illustrated, one embodiment of the present invention is not limited to such an example.

In this specification and the like, for example, a display element, a display device or a display panel which is a device including a display element, a light-emitting element, and a light-emitting device which is a device including a light-emitting element can employ a variety of modes or can include a variety of elements. The display element, the display device, the display panel, the light-emitting element, or the light-emitting device includes at least one of an electroluminescence (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical system (MEMS), a digital micromirror device (DMD), a digital micro shutter (DMS), MIRASOL (registered trademark), an interferometric modulator display (IMOD) element, a MEMS shutter display element, an optical-interference-type MEMS display element, an electrowetting element, a piezoelectric ceramic display, a display element including a carbon nanotube, and the like. Other than the above, a display medium whose contrast, luminance, reflectance, transmittance, or the like is changed by electrical or magnetic action may be included. Note that examples of a display device including an EL element include an EL display. Examples of a display device including an electron emitter include a field emission display (FED) and an SED-type flat panel display (SED: surface-conduction electron-emitter display). Examples of a display device including a liquid crystal element include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, Electronic Liquid Powder (registered trademark), or an electrophoretic element include electronic paper. In the case of a transflective liquid crystal display or a reflective liquid crystal display, some or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption.

For example, in this specification and the like, an active matrix method in which an active element is included in a pixel or a passive matrix method in which an active element is not included in a pixel can be used.

In the active matrix method, as an active element (a non-linear element), not only a transistor but also various active elements (non-linear elements), for example, a metal insulator metal (MIM), a thin film diode (TFD), or the like can be used. Since such an element has a small number of manufacturing steps, manufacturing cost can be reduced or yield can be improved. Alternatively, since the size of the element is small, the aperture ratio can be improved, so that power consumption can be reduced or higher luminance can be achieved.

Note that as a method other than an active matrix method, a passive matrix method in which an active element (a non-linear element) is not used can also be used. Since an active element (a non-linear element) is not used, the number of manufacturing steps is small, so that manufacturing cost can be reduced or yield can be improved. Alternatively, since an active element (a non-linear element) is not used, the aperture ratio can be improved, so that power consumption can be reduced or higher luminance can be achieved, for example.

At least part of this embodiment can be implemented as appropriate in combination with any of the other embodiments described in this specification.

(Embodiment 2)

In this embodiment, structure examples of a light-emitting panel that is applicable to a display portion included in the electronic device of one embodiment of the present invention and a method for manufacturing the light-emitting panel will be described.

<Specific Example 1>

FIG. 8A is a plan view of a light-emitting panel, and FIG. 8C is an example of a cross-sectional view taken along dashed-dotted line A1-A2 in FIG. 8A. The light-emitting panel described in Specific Example 1 is a top-emission light-emitting panel using a color filter method. In this embodiment, the light-emitting panel can have, for example, a structure in which sub-pixels of three colors of red (R), green (G), and blue (B) express one color, or a structure in which sub-pixels of four colors of red (R), green (G), blue (B), and white (W) express one color. There is no particular limitation on a color element, and colors other than R, G, B, and W, for example, yellow, cyan, and magenta, may be used.

The light-emitting panel illustrated in FIG. 8A includes a light-emitting portion 804, driver circuit portions 806, and a flexible printed circuit (FPC) 808. Light-emitting elements and transistors included in the light-emitting portion 804 and the driver circuit portions 806 are sealed by a substrate 801, a substrate 803, and a sealing layer 823.

The light-emitting panel illustrated in FIG. 8C includes the substrate 801, an adhesive layer 811, an insulating layer 813, a plurality of transistors, a conductive layer 857, an insulating layer 815, an insulating layer 817, a plurality of light-emitting elements, an insulating layer 821, the sealing layer 823, an overcoat 849, a coloring layer 845, a light-blocking layer 847, an insulating layer 843, an adhesive layer 841, and the substrate 803. The sealing layer 823, the overcoat 849, the insulating layer 843, the adhesive layer 841, and the substrate 803 transmit visible light.

The light-emitting portion 804 includes a transistor 820 and a light-emitting element 830 over the substrate 801 with the adhesive layer 811 and the insulating layer 813 provided between the substrate 801 and each of the transistor 820 and the light-emitting element 830. The light-emitting element 830 includes a lower electrode 831 over the insulating layer 817, an EL layer 833 over the lower electrode 831, and an upper electrode 835 over the EL layer 833. The lower electrode 831 is electrically connected to a source electrode or a drain electrode of the transistor 820. An end portion of the lower electrode 831 is covered with the insulating layer 821. The lower electrode 831 preferably reflects visible light. The upper electrode 835 transmits visible light.

The light-emitting portion 804 also includes the coloring layer 845 overlapping with the light-emitting element 830 and the light-blocking layer 847 overlapping with the insulating layer 821. The coloring layer 845 and the light-blocking layer 847 are covered with the overcoat 849. The space between the light-emitting element 830 and the overcoat 849 is filled with the sealing layer 823.

The insulating layer 815 has an effect of suppressing diffusion of impurities into a semiconductor included in the transistor. As the insulating layer 817, an insulating layer having a planarization function is preferably selected in order to reduce surface unevenness due to the transistor.

The driver circuit portion 806 each include a plurality of transistors over the substrate 801 with the adhesive layer 811 and the insulating layer 813 provided between the substrate 801 and the transistors. FIG. 8C illustrates one of the transistors included in one of the driver circuit portions 806.

The insulating layer 813 and the substrate 801 are attached to each other with the adhesive layer 811. The insulating layer 843 and the substrate 803 are attached to each other with the adhesive layer 841. It is preferable to use films with low water permeability for the insulating layers 813 and 843, in which case an impurity such as water can be prevented from entering the light-emitting element 830 or the transistor 820, leading to improved reliability of the light-emitting panel.

The conductive layer 857 is electrically connected to an external input terminal through which a signal (e.g., a video signal, a clock signal, a start signal, and a reset signal) or a potential from the outside is transmitted to the driver circuit portion 806. Here, an example in which the FPC 808 is provided as the external input terminal is described. To prevent an increase in the number of fabrication steps, the conductive layer 857 is preferably formed using the same material and step as the electrode or the wiring in the light-emitting portion or the driver circuit portion. Here, an example in which the conductive layer 857 is formed using the same material and step as the electrodes included in the transistor 820 is described.

In the light-emitting panel illustrated in FIG. 8C, a connector 825 is positioned over the substrate 803. The connector 825 is connected to the conductive layer 857 through an opening provided in the substrate 803, the adhesive layer 841, the insulating layer 843, the sealing layer 823, the insulating layer 817, and the insulating layer 815. The connector 825 is also connected to the FPC 808. The FPC 808 and the conductive layer 857 are electrically connected to each other via the connector 825. In the case where the conductive layer 857 overlaps with the substrate 803, the conductive layer 857, the connector 825, and the FPC 808 can be electrically connected to one another by forming an opening in the substrate 803 (or using a substrate having an opening portion).

The light-emitting panel in Specific Example 1 can be manufactured in the following manner: the insulating layer 813, the transistor 820, and the light-emitting element 830 are formed over a formation substrate with high heat resistance; the formation substrate is separated; and the insulating layer 813, the transistor 820, and the light-emitting element 830 are transferred to the substrate 801 and attached thereto with the adhesive layer 811. The light-emitting panel in Specific Example 1 can be manufactured in the following manner: the insulating layer 843, the coloring layer 845, and the light-blocking layer 847 are formed over a formation substrate with high heat resistance; the formation substrate is separated; and the insulating layer 843, the coloring layer 845, and the light-blocking layer 847 are transferred to the substrate 803 and attached thereto with the adhesive layer 841.

In the case where a material with low heat resistance (e.g., resin) is used for a substrate, it is difficult to expose the substrate to high temperatures in the manufacturing process. Thus, there is a limitation on conditions for forming a transistor and an insulating layer over the substrate. In the case of using a material with high water permeability (e.g., a resin), it is preferable to form a film at high temperatures to have low water permeability. In the manufacturing method of this embodiment, a transistor and the like can be formed over a formation substrate with high heat resistance; thus, a highly reliable transistor and a film with sufficiently low water permeability can be formed at high temperatures. Then, the transistor and the film are transferred to the substrate 801 and the substrate 803, whereby a highly reliable light-emitting panel can be manufactured. Thus, according to one embodiment of the present invention, a thin and/or lightweight and highly reliable light-emitting panel can be provided. Details of the manufacturing method will be described later.

<Specific Example 2>

FIG. 8B is a plan view of a light-emitting panel, and FIG. 8D is an example of a cross-sectional view taken along dashed-dotted line A3-A4 in FIG. 8B. The light-emitting panel described in Specific Example 2 is a top-emission light-emitting panel using a color filter method, which is different from that described in Specific Example 1. Portions different from those in Specific Example 1 will be described in detail here and the descriptions of portions common to those in Specific Example 1 will be omitted.

The light-emitting panel illustrated in FIG. 8D is different from the light-emitting panel illustrated in FIG. 8C in the aspects below.

The light-emitting panel illustrated in FIG. 8D includes a spacer 827 over the insulating layer 821. The spacer 827 can adjust the distance between the substrate 801 and the substrate 803.

In the light-emitting panel illustrated in FIG. 8D, the substrate 801 and the substrate 803 have different sizes. The connector 825 is positioned over the insulating layer 843 and thus does not overlap with the substrate 803. The connector 825 is connected to the conductive layer 857 through an opening provided in the insulating layer 843, the sealing layer 823, the insulating layer 817, and the insulating layer 815. Since no opening needs to be provided in the substrate 803, there is no limitation on the material of the substrate 803.

<Specific Example 3>

Figure 9A:
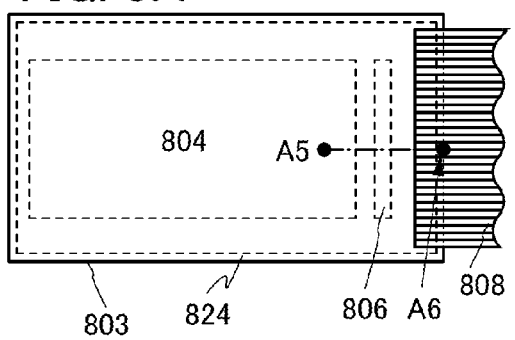
FIGS. 9A to 9E each illustrate an example of a light-emitting panel of an embodiment.
Figure 9B:
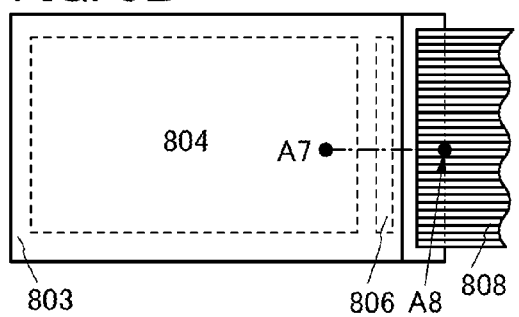
Figure 9C:
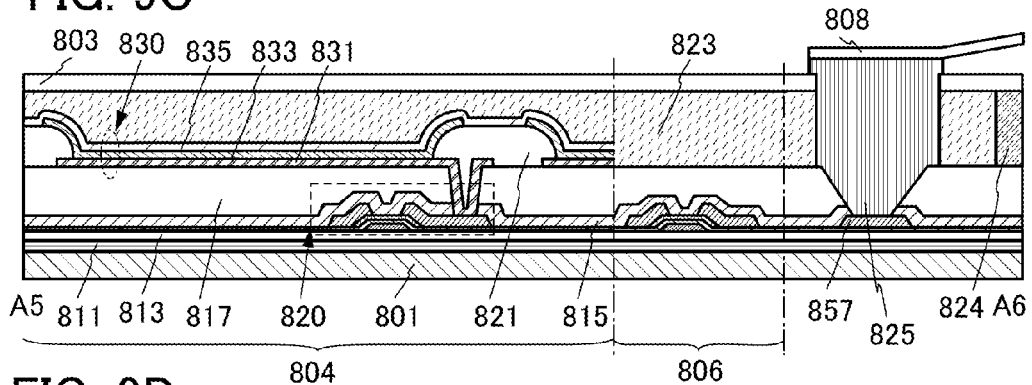

FIG. 9A is a plan view of a light-emitting panel, and FIG. 9C is an example of a cross-sectional view taken along dashed-dotted line A5-A6 in FIG. 9A. The light-emitting panel described in Specific Example 3 is a top-emission light-emitting panel using a separate coloring method.

The light-emitting panel illustrated in FIG. 9A includes the light-emitting portion 804, the driver circuit portion 806, and the FPC 808. Light-emitting elements and transistors included in the light-emitting portion 804 and the driver circuit portion 806 are sealed by the substrate 801, the substrate 803, a frame-like sealing layer 824, and the sealing layer 823.

The light-emitting panel illustrated in FIG. 9C includes the substrate 801, the adhesive layer 811, the insulating layer 813, a plurality of transistors, the conductive layer 857, the insulating layer 815, the insulating layer 817, a plurality of light-emitting elements, the insulating layer 821, the sealing layer 823, the frame-like sealing layer 824, and the substrate 803. The sealing layer 823 and the substrate 803 transmit visible light.

The frame-like sealing layer 824 preferably has a higher gas barrier property than the sealing layer 823 to prevent entry of moisture and oxygen from the outside into the light-emitting panel. Thus, the light-emitting panel can be highly reliable.

In Specific Example 3, light emitted from the light-emitting element 830 in the light-emitting panel is extracted through the sealing layer 823. For this reason, the sealing layer 823 preferably has a higher light-transmitting property and a higher refractive index than the frame-like sealing layer 824. In addition, it is preferable that a reduction in the volume of the sealing layer 823 by curing be smaller than that of the frame-like sealing layer 824.

The light-emitting portion 804 includes the transistor 820 and the light-emitting element 830 over the substrate 801 with the adhesive layer 811 and the insulating layer 813 provided between the substrate 801 and each of the transistor 820 and the light-emitting element 830. The light-emitting element 830 includes the lower electrode 831 over the insulating layer 817, the EL layer 833 over the lower electrode 831, and the upper electrode 835 over the EL layer 833. The lower electrode 831 is electrically connected to the source electrode or the drain electrode of the transistor 820. The end portion of the lower electrode 831 is covered with the insulating layer 821. The lower electrode 831 preferably reflects visible light. The upper electrode 835 transmits visible light.

The driver circuit portion 806 includes a plurality of transistors over the substrate 801 with the adhesive layer 811 and the insulating layer 813 provided between the substrate 801 and the transistors. FIG. 9C illustrates one of the transistors included in the driver circuit portion 806.

The insulating layer 813 and the substrate 801 are attached to each other with the adhesive layer 811. It is preferable to use a film with low water permeability for the insulating layer 813, in which case an impurity such as water can be prevented from entering the light-emitting element 830 or the transistor 820, leading to improved reliability of the light-emitting panel.

The conductive layer 857 is electrically connected to an external input terminal through which a signal or a potential from the outside is transmitted to the driver circuit portion 806. Here, an example in which the FPC 808 is provided as the external input terminal is described. Moreover, here, an example in which the conductive layer 857 is formed using the same material and step as the electrodes included in the transistor 820 is described.

In the light-emitting panel illustrated in FIG. 9C, the connector 825 is positioned over the substrate 803. The connector 825 is connected to the conductive layer 857 through an opening provided in the substrate 803, the sealing layer 823, the insulating layer 817, and the insulating layer 815. The connector 825 is also connected to the FPC 808. The FPC 808 and the conductive layer 857 are electrically connected to each other via the connector 825.

The light-emitting panel in Specific Example 3 can be manufactured in the following manner: the insulating layer 813, the transistor 820, and the light-emitting element 830 are formed over a formation substrate with high heat resistance; the formation substrate is separated; and the insulating layer 813, the transistor 820, and the light-emitting element 830 are transferred to the substrate 801 and attached thereto with the adhesive layer 811. A transistor and the like can be formed over a formation substrate with high heat resistance; thus, a highly reliable transistor and a film with sufficiently low water permeability can be formed at high temperatures. Then, the transistor and the film are transferred to the substrate 801, whereby a highly reliable light-emitting panel can be manufactured. Thus, according to one embodiment of the present invention, a thin and/or lightweight and highly reliable light-emitting panel can be provided.

<Specific Example 4>

FIG. 9B is a plan view of a light-emitting panel, and FIG. 8D is an example of a cross-sectional view taken along dashed-dotted line A7-A8 in FIG. 9B. The light-emitting panel described in Specific Example 4 is a bottom-emission light-emitting panel using a color filter method.

Figure 9D:
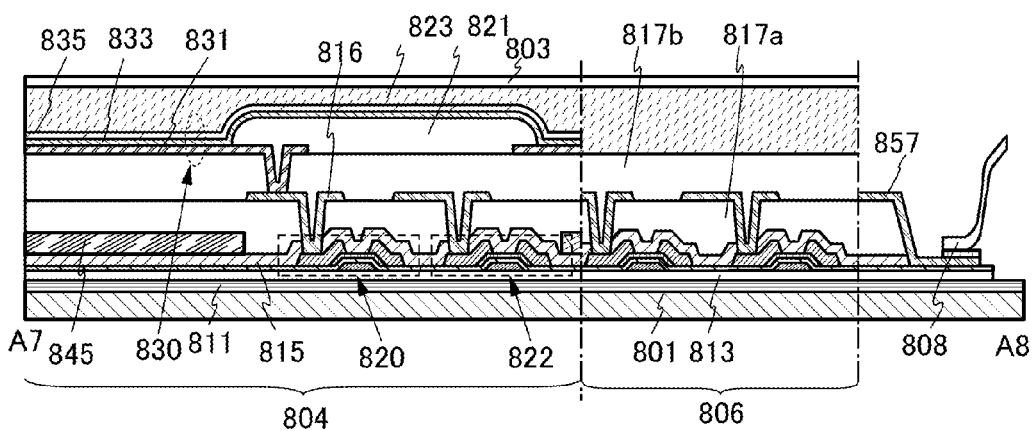

The light-emitting panel illustrated in FIG. 9D includes the substrate 801, the adhesive layer 811, the insulating layer 813, a plurality of transistors, the conductive layer 857, the insulating layer 815, the coloring layer 845, an insulating layer 817a, an insulating layer 817b, a conductive layer 816, a plurality of light-emitting elements, the insulating layer 821, the sealing layer 823, and the substrate 803. The substrate 801, the adhesive layer 811, the insulating layer 813, the insulating layer 815, the insulating layer 817a, and the insulating layer 817b transmit visible light.

The light-emitting portion 804 includes the transistor 820, a transistor 822, and the light-emitting element 830 over the substrate 801 with the adhesive layer 811 and the insulating layer 813 provided between the substrate 801 and each of the transistor 820, the transistor 822, and the light-emitting element 830. The light-emitting element 830 includes the lower electrode 831 over the insulating layer 817, the EL layer 833 over the lower electrode 831, and the upper electrode 835 over the EL layer 833. The lower electrode 831 is electrically connected to the source electrode or the drain electrode of the transistor 820. The end portion of the lower electrode 831 is covered with the insulating layer 821. The upper electrode 835 preferably reflects visible light. The lower electrode 831 transmits visible light. The coloring layer 845 that overlaps with the light-emitting element 830 can be provided anywhere; for example, the coloring layer 845 may be provided between the insulating layers 817a and 817b or between the insulating layers 815 and 817a.

The driver circuit portion 806 includes a plurality of transistors over the substrate 801 with the adhesive layer 811 and the insulating layer 813 provided between the substrate 801 and the transistors. FIG. 9D illustrates two of the transistors included in the driver circuit portion 806.

The insulating layer 813 and the substrate 801 are attached to each other with the adhesive layer 811. It is preferable to use a film with low water permeability for the insulating layer 813, in which case an impurity such as water can be prevented from entering the light-emitting element 830, the transistor 820, or the transistor 822, leading to improved reliability of the light-emitting panel.

The conductive layer 857 is electrically connected to an external input terminal through which a signal or a potential from the outside is transmitted to the driver circuit portion 806. Here, an example in which the FPC 808 is provided as the external input terminal is described. Moreover, here, an example in which the conductive layer 857 is formed using the same material and step as the conductive layer 816 is described.

The light-emitting panel in Specific Example 4 can be manufactured in the following manner: the insulating layer 813, the transistor 820, the light-emitting element 830, and the like are formed over a formation substrate with high heat resistance; the formation substrate is separated; and the insulating layer 813, the transistor 820, the light-emitting element 830, and the like are transferred to the substrate 801 and attached thereto with the adhesive layer 811. A transistor and the like can be formed over a formation substrate with high heat resistance; thus, a highly reliable transistor and a film with sufficiently low water permeability can be formed at high temperatures. Then, the transistor and the film are transferred to the substrate 801, whereby a highly reliable light-emitting panel can be manufactured. Thus, according to one embodiment of the present invention, a thin and/or lightweight and highly reliable light-emitting panel can be provided.

<Specific Example 5>

Figure 9E:
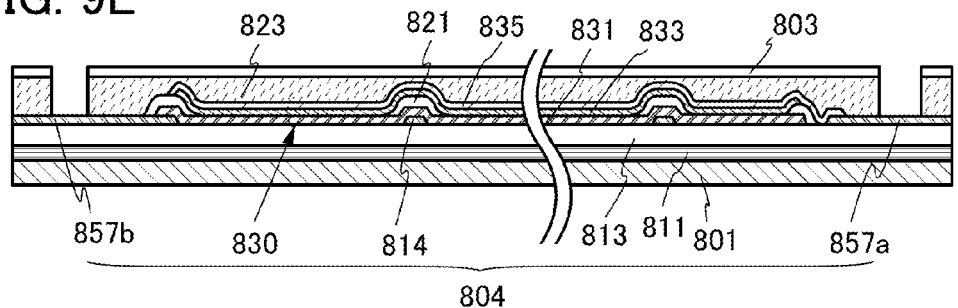

FIG. 9E illustrates an example of a light-emitting panel that is different from those described in Specific Examples 1 to 4.

The light-emitting panel illustrated in FIG. 9E includes the substrate 801, the adhesive layer 811, the insulating layer 813, a conductive layer 814, a conductive layer 857a, a conductive layer 857b, the light-emitting element 830, the insulating layer 821, the sealing layer 823, and the substrate 803.

The conductive layer 857a and the conductive layer 857b, which are external connection electrodes of the light-emitting panel, can each be electrically connected to an FPC or the like.

The light-emitting element 830 includes the lower electrode 831, the EL layer 833, and the upper electrode 835. The end portion of the lower electrode 831 is covered with the insulating layer 821. The light-emitting element 830 is a bottom-emission, top-emission, or dual-emission light-emitting element. An electrode, a substrate, an insulating layer, and the like on the light extraction side transmit visible light. The conductive layer 814 is electrically connected to the lower electrode 831.

The substrate through which light is extracted may have, as a light extraction structure, a hemispherical lens, a micro lens array, a film provided with an uneven surface structure, a light diffusing film, or the like. For example, the substrate with a light extraction structure can be formed by attaching the above lens or film to a resin substrate with an adhesive or the like having substantially the same refractive index as the substrate, or the lens or film.

The conductive layer 814 is preferably, though not necessarily, provided because voltage drop due to the resistance of the lower electrode 831 can be prevented. In addition, for a similar purpose, a conductive layer electrically connected to the upper electrode 835 may be provided over the insulating layer 821, the EL layer 833, the upper electrode 835, or the like.

The conductive layer 814 can be a single layer or a stacked layer formed using a material selected from copper, titanium, tantalum, tungsten, molybdenum, chromium, neodymium, scandium, nickel, or aluminum; an alloy material containing any of these materials as its main component; or the like. The thickness of the conductive layer 814 can be, for example, greater than or equal to 0.1 µm and less than or equal to 3 µm, preferably greater than or equal to 0.1 µm and less than or equal to 0.5 µm.

When a paste (e.g., silver paste) is used as a material for the conductive layer electrically connected to the upper electrode 835, metal particles forming the conductive layer aggregate; therefore, the surface of the conductive layer is rough and has many gaps. Thus, it is difficult for the EL layer 833 to completely cover the conductive layer; accordingly, the upper electrode and the conductive layer are preferably electrically connected to each other easily.

The light-emitting panel in Specific Example 5 can be manufactured in the following manner: the insulating layer 813, the light-emitting element 830, and the like are formed over a formation substrate with high heat resistance; the formation substrate is separated; and the insulating layer 813, the light-emitting element 830, and the like are transferred to the substrate 801 and attached thereto with the adhesive layer 811. The insulating layer 813 and the like with sufficiently low water permeability are formed over the formation substrate with high heat resistance at high temperatures and then are transferred to the substrate 801, whereby a highly reliable light-emitting panel can be manufactured. Thus, according to one embodiment of the present invention, a thin and/or lightweight and highly reliable light-emitting panel can be provided.

<Examples of Materials>

Next, materials and the like that can be used for a light-emitting panel are described. Note that description on the components already described in this specification is omitted in some cases.

For each of the substrates, a material such as glass, quartz, an organic resin, a metal, or an alloy can be used. For the substrate on the side from which light from the light-emitting element is extracted, a material which transmits that light is used.

It is particularly preferable to use a flexible substrate. For example, an organic resin; a glass material, a metal, or an alloy that is thin enough to have flexibility; or the like can be used.

An organic resin, which has a specific gravity smaller than that of glass, is preferably used for the flexible substrate, in which case the light-emitting panel can be more lightweight than in the case where glass is used.

The substrates are preferred to be formed using a material with high toughness. In that case, a light-emitting panel with high impact resistance that is robust can be provided. For example, when an organic resin substrate, a thin metal substrate, or a thin alloy substrate is used, the light-emitting panel can be lighter and more robust than the case where a glass substrate is used.

A metal material and an alloy material, which have high thermal conductivity, are preferred because they can easily conduct heat to the whole substrate and accordingly can prevent a local temperature rise in the light-emitting panel. The thickness of a substrate using a metal material or an alloy material is preferably greater than or equal to 10 µm and less than or equal to 200 µm, further preferably greater than or equal to 20 µm and less than or equal to 50 µm.

There is no particular limitation on a material of the metal substrate or the alloy substrate, but it is preferable to use, for example, aluminum, copper, nickel, a metal alloy such as an aluminum alloy or stainless steel.

Furthermore, when a material with high thermal emissivity is used for the substrate, the surface temperature of the light-emitting panel can be prevented from rising, leading to prevention of breakage or a decrease in reliability of the light-emitting panel. For example, the substrate may have a stacked-layer structure of a metal substrate and a layer with high thermal emissivity (e.g., the layer can be formed using a metal oxide or a ceramic material).

Examples of such a material having flexibility and a light-transmitting property include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinyl chloride resin. In particular, a material whose coefficient of thermal expansion is low is preferred, and for example, a polyamide imide resin, a polyimide resin, or PET can be suitably used. A substrate in which a fibrous body is impregnated with a resin (also referred to as prepreg) or a substrate whose coefficient of thermal expansion is reduced by mixing an organic resin with an inorganic filler can also be used.

The flexible substrate may have a stacked-layer structure in which a hard coat layer (such as a silicon nitride layer) by which a surface of a light-emitting device is protected from damage, a layer (such as an aramid resin layer) that can disperse pressure, or the like is stacked over a layer of any of the above-mentioned materials.

The flexible substrate may be formed by stacking a plurality of layers. When a glass layer is used, a barrier property against water and oxygen can be improved and thus a reliable light-emitting panel can be provided.

For example, a flexible substrate in which a glass layer, an adhesive layer, and an organic resin layer are stacked from the side closer to a light-emitting element can be used. The thickness of the glass layer is greater than or equal to 20 µm and less than or equal to 200 µm, preferably greater than or equal to 25 µm and less than or equal to 100 µm. With such a thickness, the glass layer can have both an excellent barrier property against water and oxygen and a high flexibility. The thickness of the organic resin layer is greater than or equal to 10 µm and less than or equal to 200 µm, preferably greater than or equal to 20 µm and less than or equal to 50 µm. Providing such organic resin layer outside the glass layer, occurrence of a crack or a break in the glass layer can be suppressed and mechanical strength can be improved. With the substrate that includes such a composite material of a glass material and an organic resin, a highly reliable and flexible light-emitting panel can be provided.

As the adhesive layer or the sealing layer, a variety of curable adhesives such as a reactive curable adhesive, a thermosetting adhesive, an anaerobic adhesive, and a photo curable adhesive such as an ultraviolet curable adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. A material with low moisture permeability, such as an epoxy resin, is particularly preferable. Alternatively, a two-component-mixture-type resin may be used. Alternatively, an adhesive sheet or the like may be used.

The resin may include a drying agent. As the drying agent, for example, a substance that adsorbs moisture by chemical adsorption, such as an oxide of an alkaline earth metal (e.g., calcium oxide or barium oxide), can be used. Alternatively, a substance that adsorbs moisture by physical adsorption, such as zeolite or silica gel, may be used. The drying agent is preferably included because it can prevent an impurity such as moisture from entering the functional element, thereby improving the reliability of the light-emitting panel.

In addition, it is preferable to mix a filler with a high refractive index or light-scattering member into the resin, in which case the efficiency of light extraction from the light-emitting element can be improved. For example, titanium oxide, barium oxide, zeolite, zirconium, or the like can be used.

There is no particular limitation on the structure of the transistors in the light-emitting panel. For example, a forward staggered transistor or an inverted staggered transistor may be used. A top-gate transistor or a bottom-gate transistor may be used. There is no particular limitation on a semiconductor material used for the transistors; for example, silicon or germanium can be used. Alternatively, an oxide semiconductor containing at least one of indium, gallium, and zinc, such as an In—Ga—Zn-based metal oxide, may be used.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

For stable characteristics of the transistor, a base film is preferably provided. The base film can be formed with an inorganic insulating film such as a silicon oxide film, a silicon nitride film, a silicon oxynitride film, or a silicon nitride oxide film to have a single-layer structure or a stacked-layer structure. The base film can be formed by a sputtering method, a chemical vapor deposition (CVD) method (e.g., a plasma CVD method, a thermal CVD method, or a metal organic CVD (MOCVD) method), an atomic layer deposition (ALD) method, a coating method, a printing method, or the like. Note that the base film is not necessarily provided. In each of the above Structure Examples, the insulating layer 813 can serve as a base film of the transistor.

As the light-emitting element, a self-luminous element can be used, and an element whose luminance is controlled by current or voltage is included in the category of the light-emitting element. For example, a light-emitting diode (LED), an organic EL element, an inorganic EL element, or the like can be used.

The light-emitting element may be a top emission, bottom emission, or dual emission light-emitting element. A conductive film that transmits visible light is used as the electrode through which light is extracted. A conductive film that reflects visible light is preferably used as the electrode through which light is not extracted.

The conductive film that transmits visible light can be formed using, for example, indium oxide, indium tin oxide (ITO), indium zinc oxide, zinc oxide, or zinc oxide to which gallium is added. Alternatively, a film of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) can be formed thin so as to have a light-transmitting property. Alternatively, a stack of any of the above materials can be used as the conductive layer. For example, a stacked film of ITO and an alloy of silver and magnesium is preferably used, in which case conductivity can be increased. Further alternatively, graphene or the like may be used.

For the conductive film that reflects visible light, for example, a metal material such as aluminum, gold, platinum, silver, nickel, tungsten, chromium, molybdenum, iron, cobalt, copper, or palladium or an alloy containing any of these metal materials can be used. Lanthanum, neodymium, germanium, or the like may be added to the metal material or the alloy. Furthermore, an alloy containing aluminum (an aluminum alloy) such as an alloy of aluminum and titanium, an alloy of aluminum and nickel, or an alloy of aluminum and neodymium; or an alloy containing silver such as an alloy of silver and copper, an alloy of silver, copper, and palladium, or an alloy of silver and magnesium can be used for the conductive film. An alloy of silver and copper is preferable because of its high heat resistance. Moreover, a metal film or a metal oxide film is stacked on an aluminum alloy film, whereby oxidation of the aluminum alloy film can be suppressed. Examples of a material for the metal film or the metal oxide film are titanium and titanium oxide. Alternatively, the conductive film having a property of transmitting visible light and a film containing any of the above metal materials may be stacked. For example, a stacked film of silver and ITO or a stacked film of an alloy of silver and magnesium and ITO can be used.

The electrodes may be formed separately by an evaporation method or a sputtering method. Alternatively, a discharging method such as an ink-jet method, a printing method such as a screen printing method, or a plating method may be used.

When a voltage higher than the threshold voltage of the light-emitting element is applied between the lower electrode 831 and the upper electrode 835, holes are injected to the EL layer 833 from the anode side and electrons are injected to the EL layer 833 from the cathode side. The injected electrons and holes are recombined in the EL layer 833 and a light-emitting substance contained in the EL layer 833 emits light.

The EL layer 833 includes at least a light-emitting layer. In addition to the light-emitting layer, the EL layer 833 may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

For the EL layer 833, either a low molecular compound or a high molecular compound can be used, and an inorganic compound may also be used. Each of the layers included in the EL layer 833 can be formed by any of the following methods: an evaporation method (including a vacuum evaporation method), a transfer method, a printing method, an ink-jet method, a coating method, and the like.

The light-emitting element is preferably provided between a pair of insulating films with low water permeability. Thus, an impurity such as water can be prevented from entering the light-emitting element, leading to prevention of a decrease in the reliability of the light-emitting device.

As an insulating film with low water permeability, a film containing nitrogen and silicon such as a silicon nitride film or a silicon nitride oxide film, a film containing nitrogen and aluminum such as an aluminum nitride film, or the like can be used. Alternatively, a silicon oxide film, a silicon oxynitride film, an aluminum oxide film, or the like can be used.

For example, the water vapor transmittance of the insulating film with low water permeability is lower than or equal to $1\times10^{-5}$ [g/m$^2$·day], preferably lower than or equal to $1\times10^{-6}$ [g/m$^2$·day], further preferably lower than or equal to $1\times10^{-7}$ [g/m$^2$·day], still further preferably lower than or equal to $1\times10^{-8}$ [g/m$^2$·day].

The insulating layers 813 and 843 are each preferably formed using an insulating film with low water permeability.

As the insulating layer 815, for example, an inorganic insulating film such as a silicon oxide film, a silicon oxynitride film, or an aluminum oxide film can be used. For example, as each of the insulating layers 817, 817a, and 817b, an organic material such as polyimide, acrylic, polyamide, polyimide amide, or a benzocyclobutene-based resin can be used. Alternatively, a low-dielectric constant material (a low-k material) or the like can be used. Furthermore, each of the insulating layers may be formed by stacking a plurality of insulating films.

The insulating layer 821 is formed using an organic insulating material or an inorganic insulating material. As the resin, for example, a polyimide resin, a polyamide resin, an acrylic resin, a siloxane resin, an epoxy resin, or a phenol resin can be used. It is particularly preferable that the insulating layer 821 be formed using a photosensitive resin material so that a sidewall of an opening has an inclined surface with continuous curvature.

There is no particular limitation on the method for forming the insulating layer 821; a photolithography method, a sputtering method, an evaporation method, a droplet discharging method (e.g., an ink-jet method), a printing method (e.g., a screen printing method or an off-set printing method), or the like may be used.

The spacer 827 can be formed using an inorganic insulating material, an organic insulating material, a metal material, or the like. As the inorganic insulating material and the organic insulating material, for example, a variety of materials that can be used for the insulating layer can be used. As the metal material, titanium, aluminum, or the like can be used. When the spacer 827 containing a conductive material and the upper electrode 835 are electrically connected to each other, a potential drop due to the resistance of the upper electrode 835 can be suppressed. The spacer 827 may have either a tapered shape or an inverse tapered shape.

A conductive layer included in the light-emitting panel, which functions as an electrode or a wiring of the transistor, an auxiliary electrode of the light-emitting element, or the like, can be formed to have a single-layer structure or a stacked-layer structure using any of metal materials such as molybdenum, titanium, chromium, tantalum, tungsten, aluminum, copper, neodymium, and scandium, and an alloy material containing any of these elements, for example. Alternatively, the conductive layer may be formed using a conductive metal oxide. As the conductive metal oxide, indium oxide (e.g., In$_2$O$_3$), tin oxide (e.g., SnO$_2$), zinc oxide (ZnO), ITO, indium zinc oxide (e.g., In$_2$O$_3$—ZnO), or any of these metal oxide materials in which silicon oxide is contained can be used.

The coloring layer is a colored layer that transmits light in a specific wavelength range. For example, a red (R) color filter for transmitting light in a red wavelength range, a green (G) color filter for transmitting light in a green wavelength range, a blue (B) color filter for transmitting light in a blue wavelength range, or the like can be used. Each coloring layer is formed in a desired position with any of various materials by a printing method, an ink-jet method, an etching method using a photolithography method, or the like.

The light-blocking layer is provided between the adjacent coloring layers. The light-blocking layer blocks light emitted from an adjacent light-emitting element to prevent color mixture between adjacent light-emitting elements. Here, the coloring layer is provided such that its end portion overlaps with the light-blocking layer, whereby light leakage can be suppressed. As the light-blocking layer, a material that can block light from the light-emitting element can be used; for example, a black matrix may be formed using a resin material containing a metal material, pigment, or dye. Note that it is preferable to provide the light-blocking layer in a region other than the light-emitting portion, such as a driver circuit portion, in which case undesired leakage of guided light or the like can be suppressed.

Furthermore, an overcoat covering the coloring layer and the light-blocking layer may be provided. With the overcoat, impurities and the like contained in the coloring layer can be prevented from being diffused into the light-emitting element. The overcoat is formed with a material that transmits light emitted from the light-emitting element; for example, an inorganic insulating film such as a silicon nitride film or a silicon oxide film, an organic insulating film such as an acrylic film or a polyimide film can be used, and a stacked-layer structure of an organic insulating film and an inorganic insulating film may be used.

In the case where upper surfaces of the coloring layer and the light-blocking layer are coated with a material of the sealing layer, a material that has high wettability with respect to the material of the sealing layer is preferably used as the material of the overcoat. For example, an oxide conductive film such as an ITO film or a metal film such as an Ag film that is thin enough to transmit light is preferably used as the overcoat.

For the connector, it is possible to use a paste-like or sheet-like material which is obtained by mixing metal particles into a thermosetting resin and for which anisotropic electric conductivity is provided by thermocompression bonding. As the metal particles, particles in which two or more kinds of metals are layered, for example, nickel particles coated with gold are preferably used.

<Example of Manufacturing Method>

Next, an example of a method for manufacturing a light-emitting panel is described with reference to FIGS. 10A to 10C and FIGS. 11A to 11C. Here, the manufacturing method is described using the light-emitting panel of Specific Example 1 (FIG. 8C) as an example.

Figure 10A:
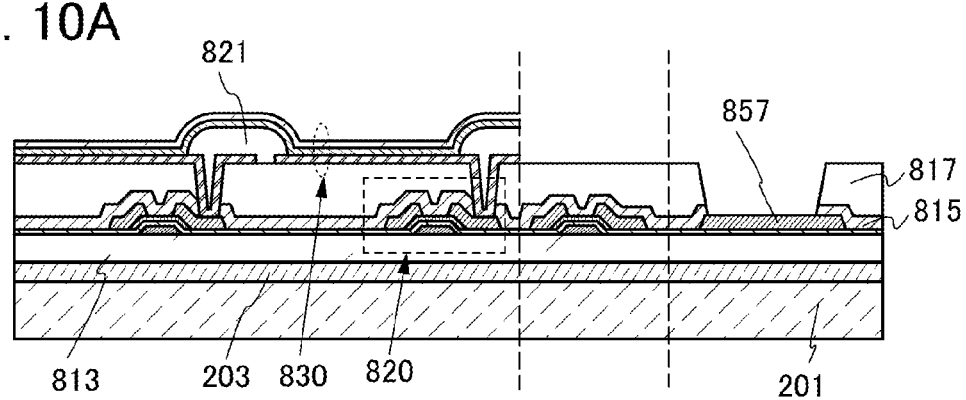
FIGS. 10A to 10C illustrate an example of a method for manufacturing a light-emitting panel of an embodiment.

First, a separation layer 203 is formed over a formation substrate 201, and the insulating layer 813 is formed over the separation layer 203. Next, the plurality of transistors, the conductive layer 857, the insulating layer 815, the insulating layer 817, the plurality of light-emitting elements, and the insulating layer 821 are formed over the insulating layer 813. An opening is formed in the insulating layers 821, 817, and 815 to expose the conductive layer 857 (FIG. 10A).

Figure 10B:
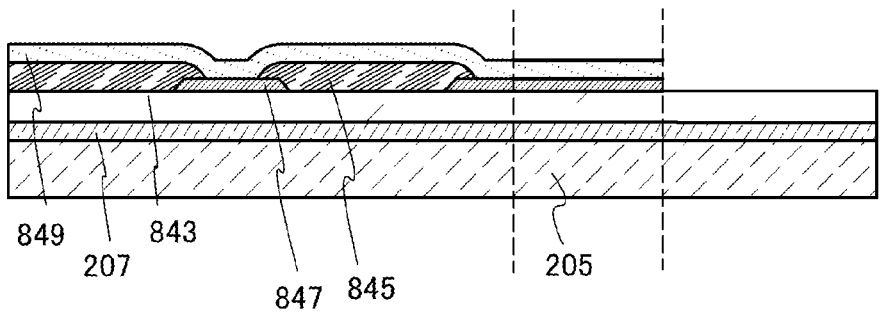

In addition, a separation layer 207 is formed over a formation substrate 205, and the insulating layer 843 is formed over the separation layer 207. Next, the light-blocking layer 847, the coloring layer 845, and the overcoat 849 are formed over the insulating layer 843 (FIG. 10B).

The formation substrate 201 and the formation substrate 205 each can be a glass substrate, a quartz substrate, a sapphire substrate, a ceramic substrate, a metal substrate, or the like.

For the glass substrate, for example, a glass material such as aluminosilicate glass, aluminoborosilicate glass, or barium borosilicate glass can be used. When the temperature of the heat treatment performed later is high, a substrate having a strain point of 730° C. or higher is preferably used as the glass substrate. Note that by containing a large amount of barium oxide (BaO), a glass substrate which is heat-resistant and more practical can be obtained. Alternatively, crystallized glass or the like may be used.

In the case where a glass substrate is used as the formation substrate, an insulating film such as a silicon oxide film, a silicon oxynitride film, a silicon nitride film, or a silicon nitride oxide film is preferably formed between the formation substrate and the separation layer, in which case contamination from the glass substrate can be prevented.

The separation layer 203 and the separation layer 207 each have a single-layer structure or a stacked-layer structure containing an element selected from tungsten, molybdenum, titanium, tantalum, niobium, nickel, cobalt, zirconium, zinc, ruthenium, rhodium, palladium, osmium, iridium, and silicon; an alloy material containing any of the elements; or a compound material containing any of the elements. A crystal structure of a layer containing silicon may be amorphous, microcrystal, or polycrystal.

The separation layer can be formed by a sputtering method, a plasma CVD method, a coating method, a printing method, or the like. Note that a coating method includes a spin coating method, a droplet discharging method, and a dispensing method.

In the case where the separation layer has a single-layer structure, a tungsten layer, a molybdenum layer, or a layer containing a mixture of tungsten and molybdenum is preferably formed. Alternatively, a layer containing an oxide or an oxynitride of tungsten, a layer containing an oxide or an oxynitride of molybdenum, or a layer containing an oxide or an oxynitride of a mixture of tungsten and molybdenum may be formed. Note that a mixture of tungsten and molybdenum is an alloy of tungsten and molybdenum, for example.

In the case where the separation layer is formed to have a stacked-layer structure including a layer containing tungsten and a layer containing an oxide of tungsten, the layer containing an oxide of tungsten may be formed as follows: the layer containing tungsten is formed first and an insulating film formed of an oxide is formed thereover, so that the layer containing an oxide of tungsten is formed at the interface between the tungsten layer and the insulating film. Alternatively, the layer containing an oxide of tungsten may be formed by performing thermal oxidation treatment, oxygen plasma treatment, nitrous oxide ($N_2O$) plasma treatment, treatment with a highly oxidizing solution such as ozone water, or the like on the surface of the layer containing tungsten. Plasma treatment or heat treatment may be performed in an atmosphere of oxygen, nitrogen, or nitrous oxide alone, or a mixed gas of any of these gasses and another gas. Surface condition of the separation layer is changed by the plasma treatment or heat treatment, whereby adhesion between the separation layer and the insulating film formed later can be controlled.

Each of the insulating layers can be formed by a sputtering method, a plasma CVD method, a coating method, a printing method, or the like. For example, the insulating layer is formed at a temperature higher than or equal to 250° C. and lower than or equal to 400° C. by a plasma CVD method, whereby the insulating layer can be a dense film with very low water permeability.

Figure 10C:
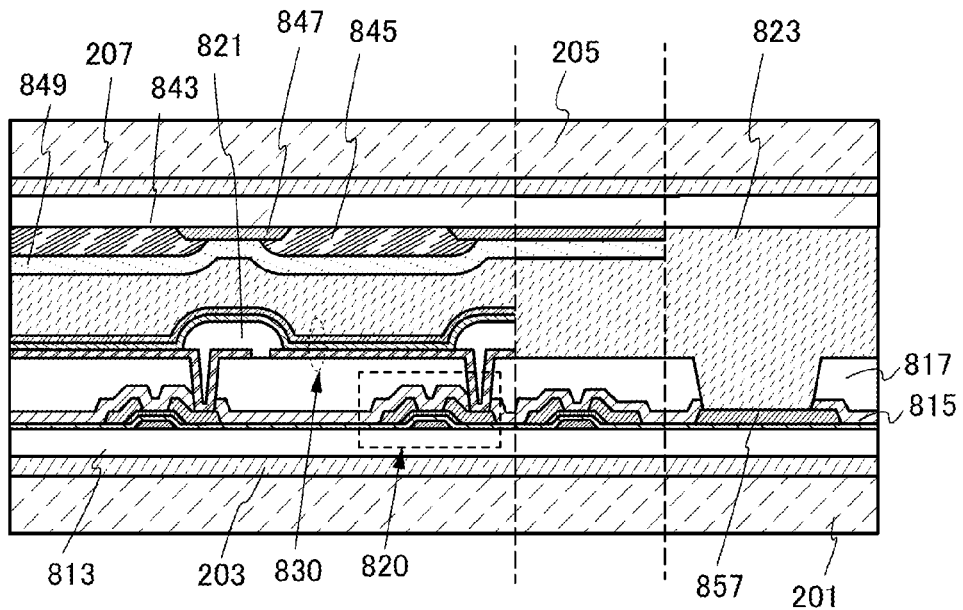

Then, a material for the sealing layer 823 is applied to a surface of the formation substrate 205 over which the coloring layer 845 and the like are formed or a surface of the formation substrate 201 over which the light-emitting element 830 and the like are formed, and the formation substrate 201 and the formation substrate 205 are attached so that these two surfaces face each other with the sealing layer 823 provided therebetween (FIG. 10C).

Next, the formation substrate 201 is separated, and the exposed insulating layer 813 and the substrate 801 are attached to each other with the adhesive layer 811. Furthermore, the formation substrate 205 is separated, and the exposed insulating layer 843 and the substrate 803 are attached to each other with the adhesive layer 841. Although the substrate 803 does not overlap with the conductive layer 857 in FIG. 11A, the substrate 803 may overlap with the conductive layer 857.

Any of a variety of methods can be used as appropriate for the separation process. For example, when a layer including a metal oxide film is formed as the separation layer on the side in contact with the layer to be separated, the metal oxide film is embrittled by crystallization, whereby the layer to be separated can be separated from the formation substrate. Alternatively, when an amorphous silicon film containing hydrogen is formed as the separation layer between a formation substrate having high heat resistance and a layer to be separated, the amorphous silicon film is removed by laser irradiation or etching, whereby the layer to be separated can be separated from the formation substrate. Alternatively, after a layer including a metal oxide film is formed as the separation layer on the side in contact with the layer to be separated, the metal oxide film is embrittled by crystallization, and part of the separation layer is removed by etching using a solution or a fluoride gas such as $NF_3$, $BrF_3$, or $ClF_3$, whereby the separation can be performed at the embrittled metal oxide film. Further alternatively, a method carried out as follows may be employed: a film containing nitrogen, oxygen, hydrogen, or the like (e.g., an amorphous silicon film containing hydrogen, an alloy film containing hydrogen, or an alloy film containing oxygen) is used as the separation layer, and the separation layer is irradiated with laser to release the nitrogen, oxygen, or hydrogen contained in the separation layer as gas, thereby promoting separation between the layer to be separated and the formation substrate. Still further alternatively, it is possible to use a method in which the formation substrate provided with the layer to be separated is removed mechanically or by etching using a solution or a fluoride gas such as $NF_3$, $BrF_3$, or $ClF_3$, or the like. In this case, the separation layer is not necessarily provided.

When a plurality of the above-described separation methods are combined, the separation process can be performed easily. In other words, separation can be performed with physical force (by a machine or the like) after performing laser irradiation, etching on the separation layer with a gas, a solution, or the like, or mechanical removal with a sharp knife, scalpel or the like so that the separation layer and the layer to be separated can be easily separated from each other.

Separation of the layer to be separated from the formation substrate may be performed by soaking the interface between the separation layer and the layer to be separated in a liquid. Furthermore, the separation may be performed while a liquid such as water is being poured.

As another separation method, in the case where the separation layer is formed using tungsten, it is preferable that the separation be performed while etching the separation layer using a mixed solution of ammonium water and a hydrogen peroxide solution.

Note that the separation layer is not necessarily provided in the case where separation at an interface between the formation substrate and the layer to be separated is possible. For example, glass is used as the formation substrate, an organic resin such as polyimide, polyester, polyolefin, polyamide, polycarbonate, or acrylic is formed in contact with the glass, and an insulating film, a transistor, and the like are formed over the organic resin. In this case, heating the organic resin enables the separation at the interface between the formation substrate and the organic resin. Alternatively, separation at the interface between a metal layer and the organic resin may be performed in the following manner: the metal layer is provided between the formation substrate and the organic resin and current is made to flow in the metal layer so that the metal layer is heated.

Figure 11A:
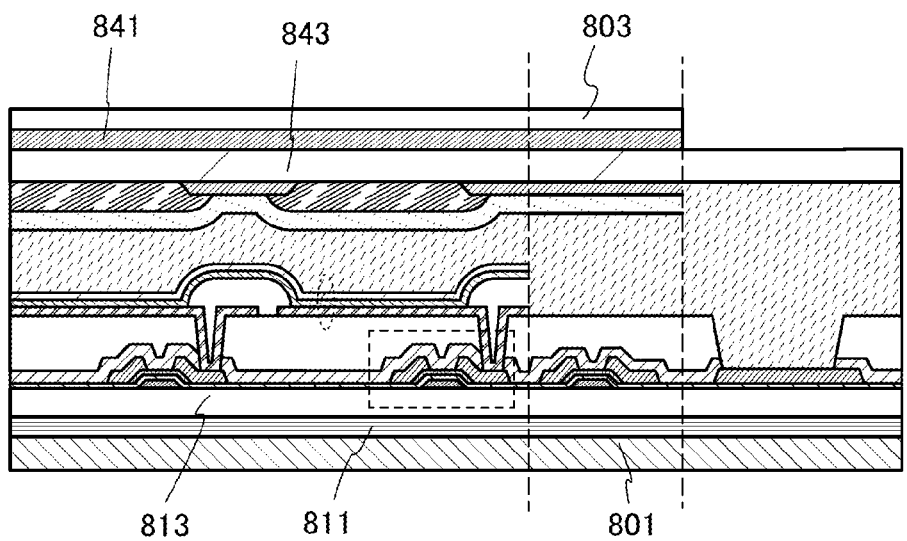
FIGS. 11A to 11C each illustrate an example of a method for manufacturing a light-emitting panel of an embodiment.
Figure 11B:
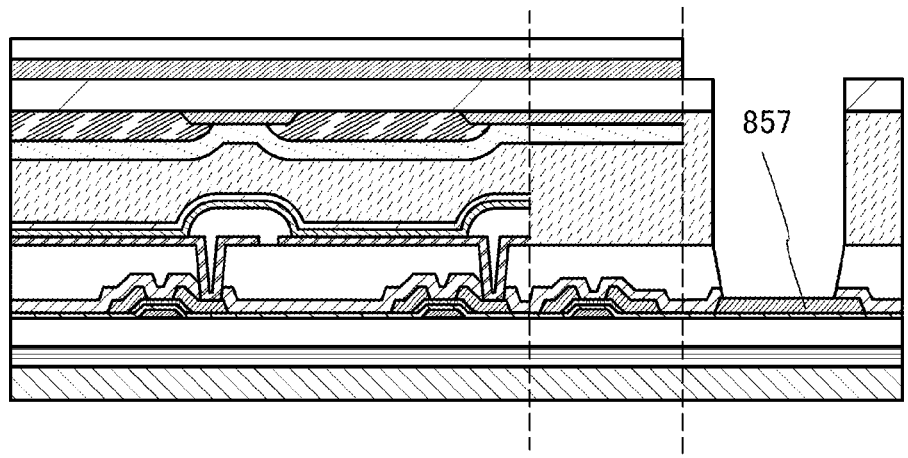
Figure 11C:
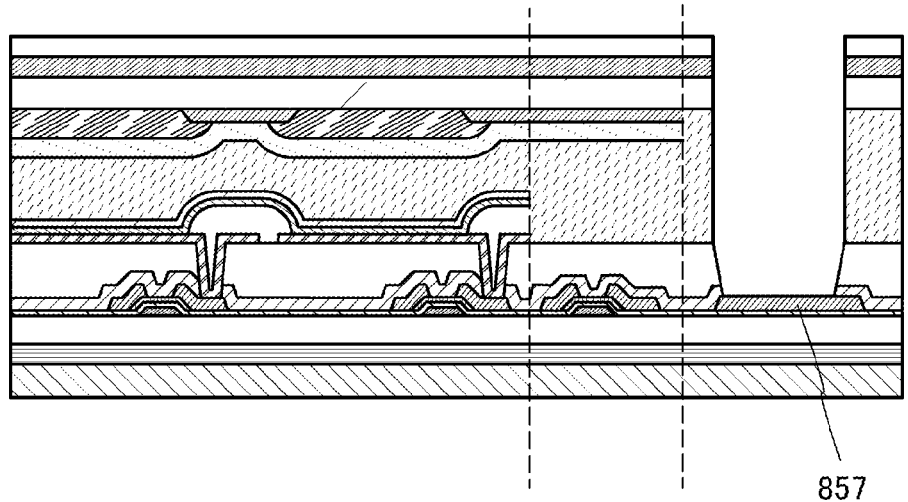

Lastly, an opening is formed in the insulating layer 843 and the sealing layer 823 to expose the conductive layer 857 (FIG. 11B). In the case where the substrate 803 overlaps with the conductive layer 857, an opening is formed also in the substrate 803 and the adhesive layer 841 so that the conductive layer 857 is exposed (FIG. 11C). There is no particular limitation on the method for forming the opening. For example, a laser ablation method, an etching method, an ion beam sputtering method, or the like may be used. As another method, a cut may be made in a film over the conductive layer 857 with a sharp knife or the like and part of the film may be separated by physical force.

In the above-described manner, the light-emitting panel can be manufactured.

At least part of this embodiment can be implemented as appropriate in combination with any of the other embodiments described in this specification.

(Embodiment 3)

In this embodiment, structure examples of a foldable touch panel that is applicable to a display portion included in the electronic device of one embodiment of the present invention will be described with reference to FIGS. 12A to 12C, FIGS. 13A and 13B, FIGS. 14A to 14C, and FIGS. 15A to 15C. Note that for a material of each layer, refer to Embodiment 2.

<Structure Example 1>

Figure 12A:
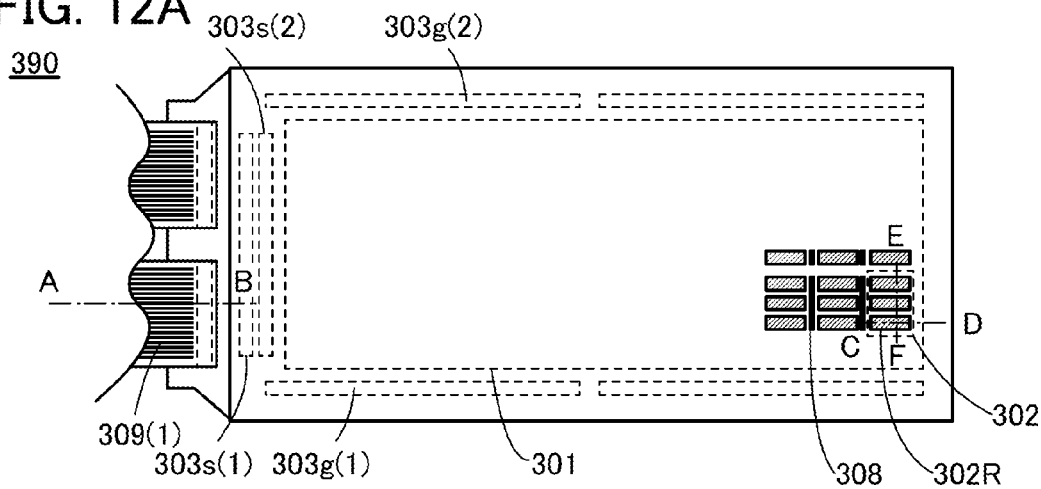
FIGS. 12A to 12C illustrate an example of a touch panel of an embodiment.
Figure 12B:
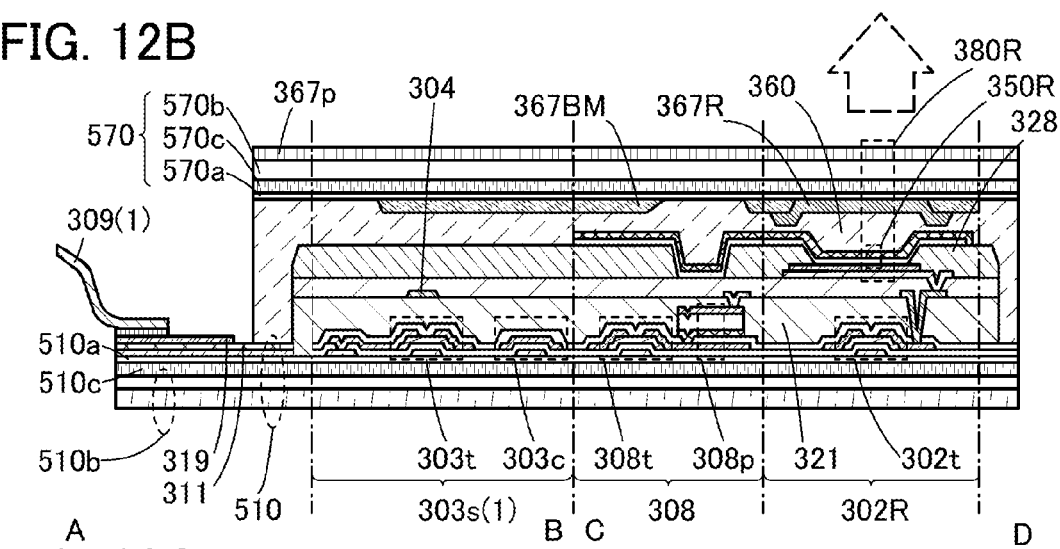
Figure 12C:
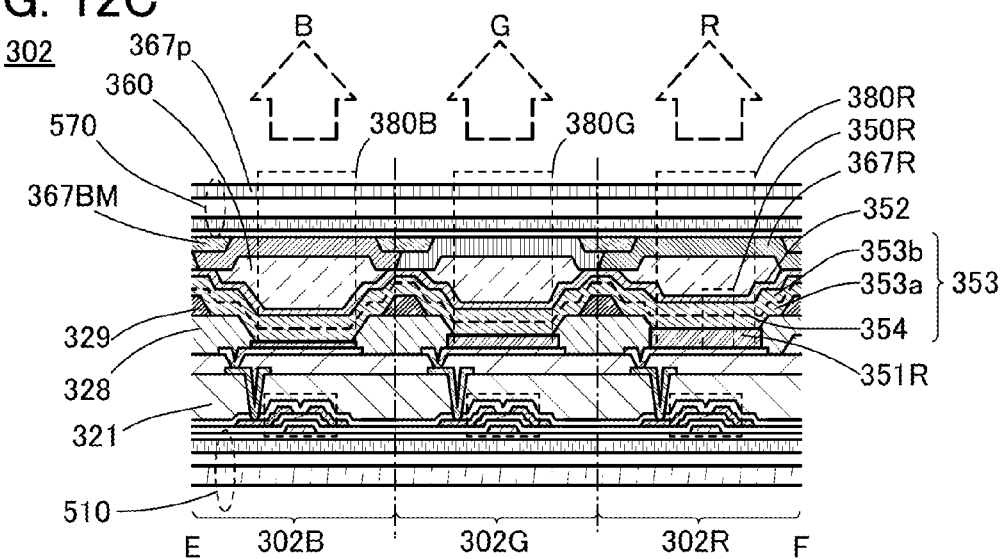

FIG. 12A is a top view of the touch panel. FIG. 12B is a cross-sectional view taken along dashed-dotted line A-B and dashed-dotted line C-D in FIG. 12A. FIG. 12C is a cross-sectional view taken along dashed-dotted line E-F in FIG. 12A.

As illustrated in FIG. 12A, a touch panel 390 includes a display portion 301.

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, in the sub-pixels, light-emitting elements and pixel circuits that can supply electric power for driving the light-emitting elements are provided.

The pixel circuits are electrically connected to wirings through which selection signals are supplied and wirings through which image signals are supplied.

Furthermore, the touch panel 390 is provided with a scan line driver circuit 303g(1) that can supply selection signals to the pixels 302 and an image signal line driver circuit 303s(1) that can supply image signals to the pixels 302.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time it takes for an imaging pixel circuit to detect light.

The touch panel 390 is provided with an imaging pixel driver circuit 303g(2) that can supply control signals to the imaging pixels 308 and an imaging signal line driver circuit 303s(2) that reads out imaging signals.

As illustrated in FIG. 12B, the touch panel 390 includes a substrate 510 and a substrate 570 that faces the substrate 510.

Flexible materials can be favorably used for the substrate 510 and the substrate 570.

Materials with which passage of impurities is inhibited can be favorably used for the substrate 510 and the substrate 570. For example, materials with a vapor permeability of lower than or equal to $10^{-5}$ g/m$^2$·day, preferably lower than or equal to $10^{-6}$ g/m$^2$·day can be favorably used.

The substrate 510 can be favorably formed using a material whose coefficient of linear expansion is substantially equal to that of the substrate 570. For example, the coefficient of linear expansion of the materials are preferably lower than or equal to $1\times10^{-3}$/K, further preferably lower than or equal to $5\times10^{-5}$/K, and still further preferably lower than or equal to $1\times10^{-5}$/K.

The substrate 510 is a stacked body including a flexible substrate 510b, an insulating layer 510a that prevents diffusion of impurities to the light-emitting elements, and an adhesive layer 510c that bonds the insulating layer 510a to the flexible substrate 510b.

The substrate 570 is a stacked body including a flexible substrate 570b, an insulating layer 570a that prevents diffusion of impurities to the light-emitting elements, and an adhesive layer 570c that bonds the insulating layer 570a to the flexible substrate 570b.

For example, materials that include polyester, polyolefin, polyamide (e.g., nylon, aramid), polyimide, polycarbonate, or a resin having an acrylic bond, a urethane bond, an epoxy bond, or a siloxane bond can be used for the adhesive layer.

A sealing layer 360 bonds the substrate 570 to the substrate 510. The sealing layer 360 has a refractive index higher than that of air. In the case where light is extracted through the sealing layer 360, the sealing layer 360 also serves as a layer (hereinafter, also referred to as an optical bonding layer) that optically bonds two components (here, the substrates 510 and 570) between which the sealing layer 360 is sandwiched. The pixel circuits and the light-emitting elements (e.g., a first light-emitting element 350R) are provided between the substrate 510 and the substrate 570.

Each of the pixels 302 includes the sub-pixel 302R, a sub-pixel 302G, and a sub-pixel 302B (FIG. 12C). The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit that can supply electric power to the first light-emitting element 350R and includes a transistor 302$t$ (FIG. 12B). Furthermore, the light-emitting module 380R includes the first light-emitting element 350R and an optical element (e.g., a first coloring layer 367R).

The first light-emitting element 350R includes a first lower electrode 351R, an upper electrode 352, and an EL layer 353 between the first lower electrode 351R and the upper electrode 352 (FIG. 12C).

The EL layer 353 includes a first EL layer 353$a$, a second EL layer 353$b$, and an intermediate layer 354 between the first EL layer 353$a$ and the second EL layer 353$b$.

The light-emitting module 380R includes the first coloring layer 367R on the substrate 570. The coloring layer transmits light of a particular wavelength and is, for example, a layer that selectively transmits light of red, green, or blue color. Note that a region that transmits light emitted from the light-emitting element as it is may be provided as well.

The light-emitting module 380R, for example, includes the sealing layer 360 that is in contact with the first light-emitting element 350R and the first coloring layer 367R.

The first coloring layer 367R is positioned in a region overlapping with the first light-emitting element 350R. Accordingly, part of light emitted from the first light-emitting element 350R passes through the sealing layer 360 that also serves as an optical bonding layer and through the first coloring layer 367R and is emitted to the outside of the light-emitting module 380R as indicated by arrows in FIGS. 12B and 12C.

The touch panel 390 includes a light-blocking layer 367BM on the substrate 570. The light-blocking layer 367BM is provided so as to surround the coloring layer (e.g., the first coloring layer 367R).

The touch panel 390 includes an anti-reflective layer 367$p$ positioned in a region overlapping with the display portion 301. As the anti-reflective layer 367$p$, a circular polarizing plate can be used, for example.

The touch panel 390 includes an insulating layer 321. The insulating layer 321 covers the transistor 302$t$. Note that the insulating layer 321 can be used as a layer for planarizing unevenness caused by the pixel circuits. An insulating film on which a layer that can prevent diffusion of impurities to the transistor 302$t$ and the like is stacked can be used as the insulating layer 321.

The touch panel 390 includes the light-emitting elements (e.g., the first light-emitting element 350R) over the insulating layer 321.

The touch panel 390 includes, over the insulating layer 321, a partition 328 that overlaps with an end portion of the first lower electrode 351R. In addition, a spacer 329 that controls the distance between the substrate 510 and the substrate 570 is provided on the partition 328.

The image signal line driver circuit 303$s$(1) includes a transistor 303$t$ and a capacitor 303$c$. Note that the driver circuit and the pixel circuits can be formed in the same process over the same substrate. As illustrated in FIG. 12B, the transistor 303$t$ may include a second gate 304 over the insulating layer 321. The second gate 304 may be electrically connected to a gate of the transistor 303$t$. Alternatively, different potentials may be supplied to the second gate 304 and the gate of the transistor 303$t$. The second gate 304 may be provided in a transistor 308$t$, the transistor 302$t$, or the like if necessary.

The imaging pixels 308 each include a photoelectric conversion element 308$p$ and an imaging pixel circuit for sensing light received by the photoelectric conversion element 308$p$. The imaging pixel circuit includes the transistor 308$t$.

For example, a PIN photodiode can be used as the photoelectric conversion element 308$p$.

The touch panel 390 includes a wiring 311 through which a signal can be supplied. The wiring 311 is provided with a terminal 319. Note that an FPC 309(1) through which a signal such as an image signal or a synchronization signal can be supplied is electrically connected to the terminal 319. Note that a printed wiring board (PWB) may be attached to the FPC 309(1).

Transistors formed in the same process can be used as the transistor 302$t$, the transistor 303$t$, the transistor 308$t$, and the like. Embodiment 2 can be referred to for the structures of the transistors.

As a gate, source, and drain of a transistor, and a wiring or an electrode included in a touch panel, a single-layer structure or a stacked-layer structure using any of metals such as aluminum, titanium, chromium, nickel, copper, yttrium, zirconium, molybdenum, silver, tantalum, and tungsten, or an alloy containing any of these metals as its main component can be used. For example, a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may be used. Copper containing manganese is preferably used because controllability of a shape by etching is increased.

<Structure Example 2>

Figure 13A:
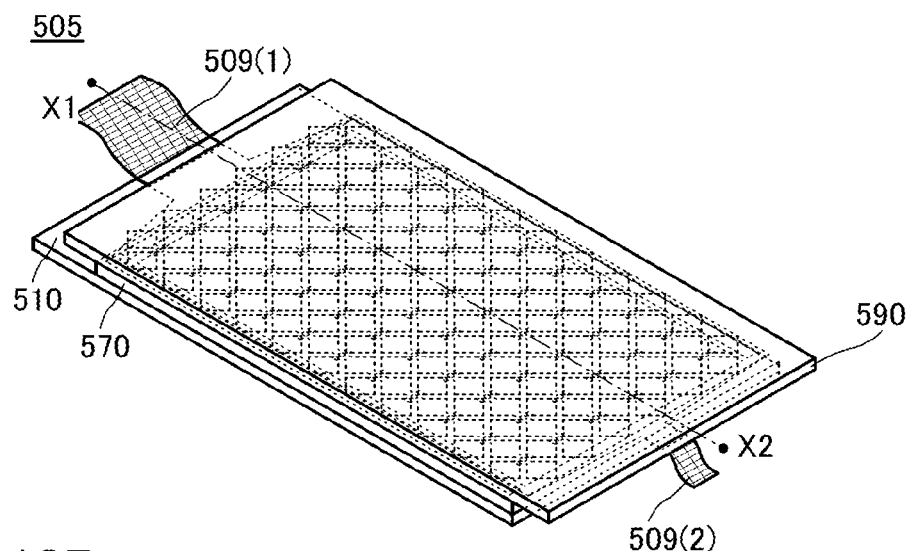
FIGS. 13A and 13B illustrate an example of a touch panel of an embodiment.
Figure 13B:
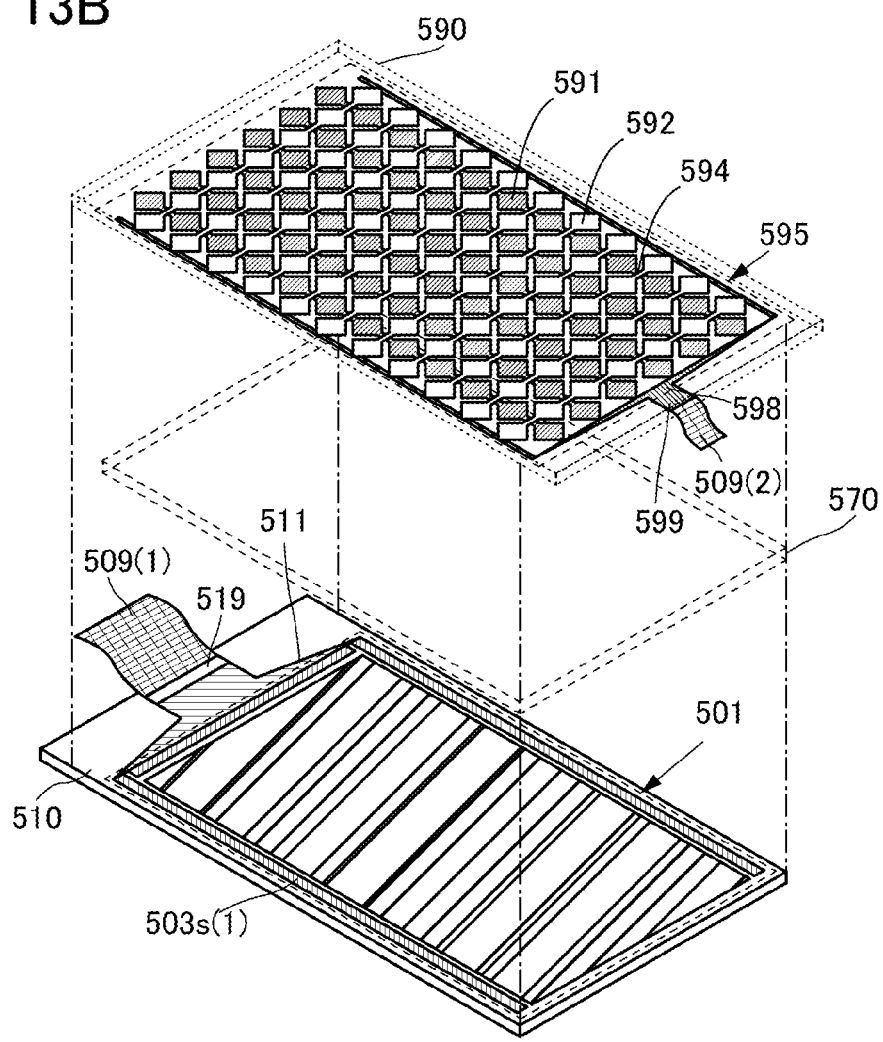
Figure 14A:
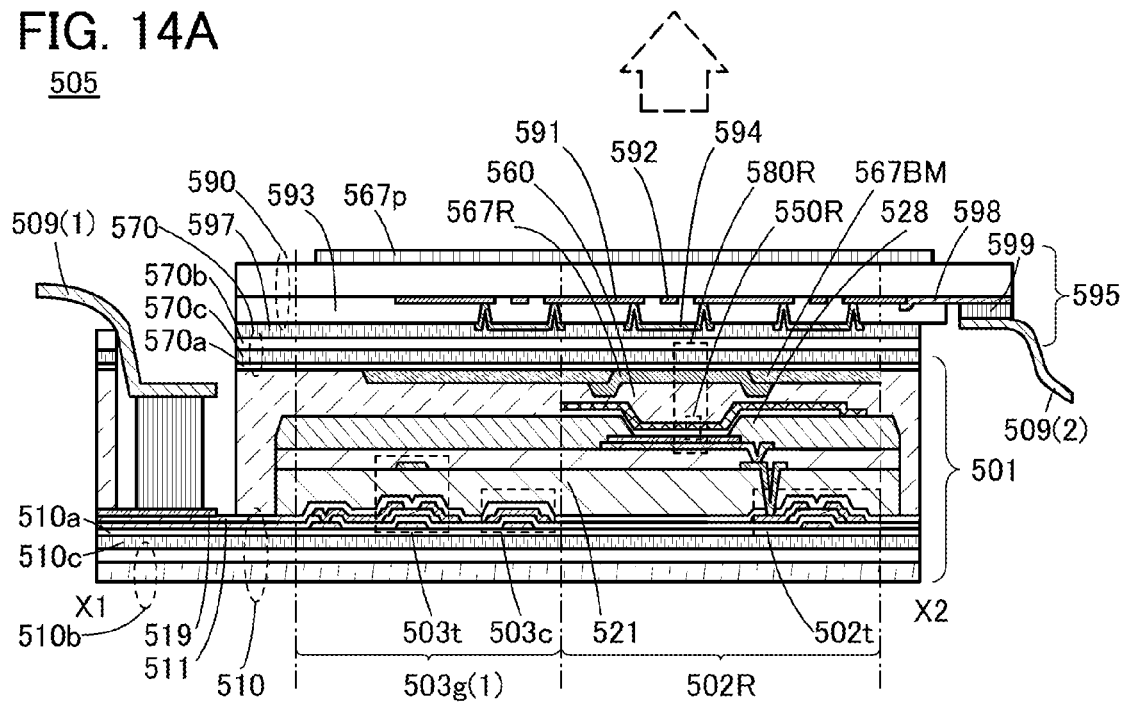
FIGS. 14A to 14C each illustrate an example of a touch panel of an embodiment.
Figure 14B:
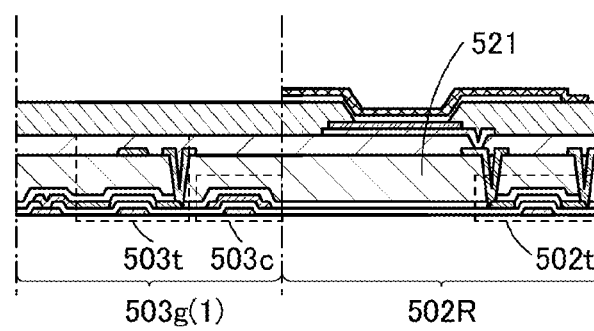
Figure 14C:
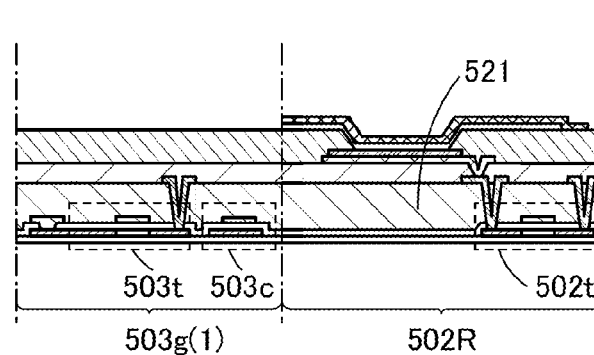

FIGS. 13A and 13B are perspective views of a touch panel 505. For simplicity, only main components are illustrated. FIGS. 14A to 14C are cross-sectional views along dashed-dotted line X1-X2 in FIG. 13A.

The touch panel 505 includes a display portion 501 and a touch sensor 595 (FIG. 13B). Furthermore, the touch panel 505 includes the substrate 510, the substrate 570, and a substrate 590. Note that the substrate 510, the substrate 570, and the substrate 590 each have flexibility.

The display portion 501 includes the substrate 510, a plurality of pixels over the substrate 510, and a plurality of wirings 511 through which signals are supplied to the pixels. The plurality of wirings 511 are led to a peripheral portion of the substrate 510, and part of the plurality of wirings 511 form a terminal 519. The terminal 519 is electrically connected to an FPC 509(1).

The substrate 590 includes the touch sensor 595 and a plurality of wirings 598 electrically connected to the touch sensor 595. The plurality of wirings 598 are led to a peripheral portion of the substrate 590, and part of the plurality of wirings 598 form a terminal. The terminal is electrically connected to an FPC 509(2). Note that in FIG. 13B, electrodes, wirings, and the like of the touch sensor 595 provided on the back side of the substrate 590 (on the substrate 510 side) are indicated by solid lines for clarity.

As the touch sensor 595, a capacitive touch sensor can be used. Examples of the capacitive touch sensor are a surface capacitive touch sensor and a projected capacitive touch sensor.

Examples of the projected capacitive touch sensor are a self capacitive touch sensor and a mutual capacitive touch sensor, which differ mainly in the driving method. The use of a mutual capacitive touch sensor is preferable because multiple points can be sensed simultaneously.

An example of using a projected capacitive touch sensor will be described below with reference to FIG. 13B.

Note that a variety of sensors that can sense the closeness or the contact of a sensing target such as a finger can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrodes 592 each have a shape of a plurality of quadrangles arranged in one direction with one corner of a quadrangle connected to one corner of another quadrangle as illustrated in FIGS. 13A and 13B.

The electrodes 591 each have a quadrangular shape and are arranged in a direction intersecting with the direction in which the electrodes 592 extend.

A wiring 594 electrically connects two electrodes 591 between which one electrode 592 is positioned. The intersecting area of the electrode 592 and the wiring 594 is preferably as small as possible. Such a structure allows a reduction in the area of a region where the electrodes are not provided, reducing unevenness in transmittance. As a result, unevenness in luminance of light from the touch sensor 595 can be reduced.

Note that the shapes of the electrodes 591 and the electrodes 592 are not limited to the above-mentioned shapes and can be any of a variety of shapes. For example, the plurality of electrodes 591 may be provided so that space between the electrodes 591 are reduced as much as possible, and a plurality of electrodes 592 may be provided with an insulating layer sandwiched between the electrodes 591 and the electrodes 592 and may be spaced apart from each other to form a region not overlapping with the electrodes 591. In that case, between two adjacent electrodes 592, a dummy electrode that is electrically insulated from these electrodes is preferably provided, whereby the area of a region having a different transmittance can be reduced.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591 to each other.

An adhesive layer 597 bonds the substrate 590 to the substrate 570 so that the touch sensor 595 overlaps with the display portion 501.

The electrodes 591 and the electrodes 592 are formed using a light-transmitting conductive material. As the light-transmitting conductive material, a conductive oxide such as indium oxide, indium tin oxide, indium zinc oxide, zinc oxide, or zinc oxide to which gallium is added can be used. Note that a film including graphene may be used as well. The film containing graphene can be formed, for example, by reducing a film containing graphene oxide. As a reducing method, a method with application of heat or the like can be employed.

The electrodes 591 and the electrodes 592 may be formed by depositing a light-transmitting conductive material on the substrate 590 by a sputtering method and then removing an unnecessary portion by any of various patterning techniques such as photolithography.

Examples of a material for the insulating layer 593 are a resin such as acrylic or epoxy resin, a resin having a siloxane bond, and an inorganic insulating material such as silicon oxide, silicon oxynitride, or aluminum oxide.

Furthermore, openings reaching the electrodes 591 are formed in the insulating layer 593, and the wiring 594 electrically connects the adjacent electrodes 591. A light-transmitting conductive material can be favorably used as the wiring 594 because the aperture ratio of the touch panel can be increased. Moreover, a material with higher conductivity than the conductivities of the electrodes 591 and the electrodes 592 can be favorably used for the wiring 594 because electric resistance can be reduced.

One of the electrodes 592 extends in one direction, and a plurality of electrodes 592 are provided in the form of stripes.

The wiring 594 intersects with the electrodes 592.

Adjacent electrodes 591 are provided with one of the electrodes 592 provided therebetween. The wiring 594 electrically connects the adjacent electrodes 591.

Note that the plurality of electrodes 591 is not necessarily arranged in the direction orthogonal to one electrode 592 and may be arranged to intersect with one electrode 592 at an angle of less than 90°.

One wiring 598 is electrically connected to any of the electrodes 591 and the electrodes 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

Furthermore, a connection layer 599 electrically connects the wiring 598 to the FPC 509(2).

As the connection layer 599, any of various anisotropic conductive films (ACF), anisotropic conductive pastes (ACP), and the like can be used.

The adhesive layer 597 has a light-transmitting property. For example, a thermosetting resin or an ultraviolet curable resin can be used; specifically, a resin such as an acrylic resin, a urethane resin, an epoxy resin, or a resin having a siloxane bond can be used.

The display portion 501 includes a plurality of pixels arranged in a matrix. Each of the pixels includes a display element and a pixel circuit for driving the display element.

In this embodiment, an example of using an organic EL element that emits white light as a display element will be described; however, the display element is not limited to such element.

For example, organic EL elements that emit light of different colors may be included in sub-pixels so that the light of different colors can be emitted from the respective sub-pixels.

The substrate 510, the substrate 570, and a sealing layer 560 can have structures similar to those in Structure Example 1.

A pixel includes a sub-pixel 502R, and the sub-pixel 502R includes a light-emitting module 580R.

The sub-pixel 502R includes a first light-emitting element 550R and a pixel circuit including a transistor 502t that can supply electric power to the first light-emitting element 550R. Furthermore, the light-emitting module 580R includes the first light-emitting element 550R and an optical element (e.g., a coloring layer 567R).

The first light-emitting element 550R includes a lower electrode, an upper electrode, and an EL layer between the lower electrode and the upper electrode.

The light-emitting module 580R includes the first coloring layer 567R on the light extraction side.

In the case where the sealing layer 560 is provided on the light extraction side, the sealing layer 560 is in contact with the first light-emitting element 550R and the first coloring layer 567R.

The first coloring layer 567R is positioned in a region overlapping with the first light-emitting element 550R. Accordingly, part of light emitted from the first light-emitting element 550R passes through the first coloring layer 567R and is emitted to the outside of the light-emitting module 580R as indicated by an arrow in FIG. 14A.

The display portion 501 includes a light-blocking layer 567BM on the light extraction side. The light-blocking layer 567BM is provided so as to surround the coloring layer (e.g., the first coloring layer 567R).

The display portion 501 includes an anti-reflective layer 567p positioned in a region overlapping with pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness caused by the pixel circuits. A stacked film including a layer that can prevent diffusion of impurities can be used as the insulating film 521. This can prevent the reliability of the transistor 502t or the like from being lowered by diffusion of impurities.

The display portion 501 includes the light-emitting elements (e.g., the first light-emitting element 550R) over the insulating film 521.

The display portion 501 includes, over the insulating film 521, a partition 528 that overlaps with an end portion of a first lower electrode. In addition, a spacer that controls the distance between the substrate 510 and the substrate 570 is provided on the partition 528.

A scan line driver circuit 503g(1) includes a transistor 503t and a capacitor 503c. Note that the driver circuit and the pixel circuits can be formed in the same process over the same substrate.

The display portion 501 includes the wirings 511 through which signals can be supplied. The wirings 511 are provided with the terminal 519. Note that the FPC 509(1) through which a signal such as an image signal or a synchronization signal can be supplied is electrically connected to the terminal 519.

Note that a printed wiring board (PWB) may be attached to the FPC 509(1).

The display portion 501 includes wirings such as scan lines, signal lines, and power supply lines. Any of various conductive films described the above can be used as the wirings.

Note that any of various kinds of transistors can be used in the display portion 501. A structure in the case of using bottom-gate transistors in the display portion 501 is illustrated in FIGS. 14A and 14B.

For example, a semiconductor layer containing an oxide semiconductor, amorphous silicon, or the like can be used in the transistor 502t and the transistor 503t illustrated in FIG. 14A.

For example, a semiconductor layer containing polycrystalline silicon that is obtained by crystallization process such as laser annealing can be used in the transistor 502t and the transistor 503t illustrated in FIG. 14B.

A structure in the case of using top-gate transistors in the display portion 501 is illustrated in FIG. 14C.

For example, a semiconductor layer including polycrystalline silicon, a single crystal silicon film that is transferred from a single crystal silicon substrate, or the like can be used in the transistor 502t and the transistor 503t illustrated in FIG. 14C.

<Structure Example 3>

Figure 15A:
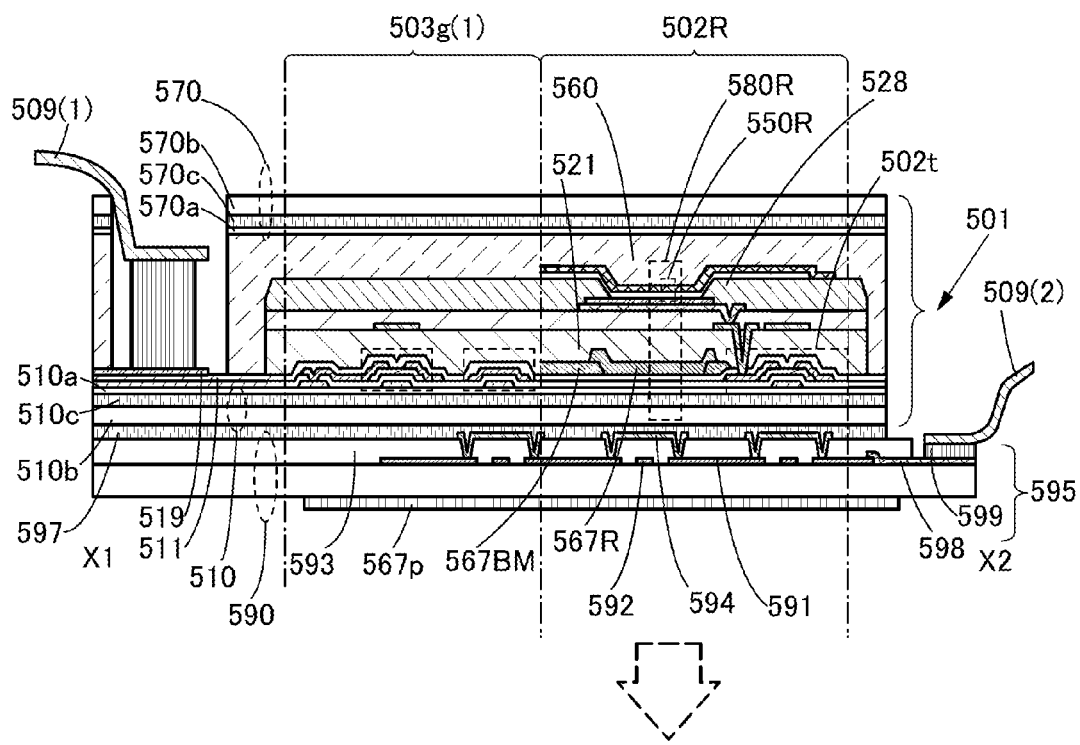
FIGS. 15A to 15C each illustrate an example of a touch panel of an embodiment.
Figure 15B:
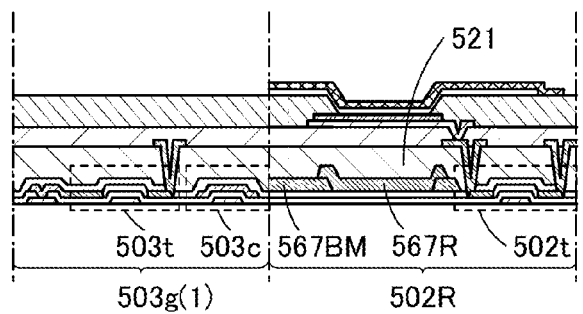
Figure 15C:
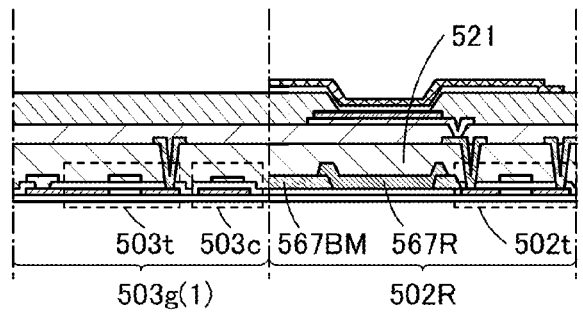

FIGS. 15A to 15C are cross-sectional views of a touch panel 505B. The touch panel 505B described in this embodiment is different from the touch panel 505 described in Structure Example 2 in that the display portion 501 displays received image data to the side where the transistors are provided and that the touch sensor is provided on the substrate 510 side of the display portion. Different structures will be described in detail below, and the above description is referred to for the other similar structures.

The first coloring layer 567R is positioned in a region overlapping with the first light-emitting element 550R. The first light-emitting element 550R illustrated in FIG. 15A emits light to the side where the transistor 502t is provided. Accordingly, part of light emitted from the first light-emitting element 550R passes through the first coloring layer 567R and is emitted to the outside of the light-emitting module 580R as indicated by an arrow in FIG. 15A.

The display portion 501 includes the light-blocking layer 567BM on the light extraction side. The light-blocking layer 567BM is provided so as to surround the coloring layer (e.g., the first coloring layer 567R).

The touch sensor 595 is provided on the substrate 510 side of the display portion 501 (FIG. 15A).

The adhesive layer 597 is provided between the substrates 510 and 590 and bonds the touch sensor 595 to the display portion 501.

Note that any of various kinds of transistors can be used in the display portion 501. A structure in the case of using bottom-gate transistors in the display portion 501 is illustrated in FIGS. 15A and 15B.

For example, a semiconductor layer containing an oxide semiconductor, amorphous silicon, or the like can be used in the transistor 502t and the transistor 503t illustrated in FIG. 15A.

For example, a semiconductor layer containing polycrystalline silicon or the like can be used in the transistor 502t and the transistor 503t illustrated in FIG. 15B.

A structure in the case of using top-gate transistors in the display portion 501 is illustrated in FIG. 15C.

For example, a semiconductor layer containing polycrystalline silicon, a transferred single crystal silicon film, or the like can be used in the transistor 502t and the transistor 503t illustrated in FIG. 15C.

At least part of this embodiment can be implemented as appropriate in combination with any of the other embodiments described in this specification.

This application is based on Japanese Patent Application serial no. 2014-024647 filed with Japan Patent Office on Feb. 12, 2014, the entire contents of which are hereby incorporated by reference.

What is claimed is:

1. An electronic device comprising:
a camera; and
a display portion being flexible,
wherein the display portion comprises a first region and a second region,
wherein the display portion bends so that the first region and the second region face in different directions,
wherein the camera overlaps with the display portion,
wherein the display portion comprises a first pixel and a second pixel,
wherein the first pixel comprises a first light-emitting element,
wherein the second pixel comprises a second light-emitting element,
wherein a third light-emitting element is between the first pixel and the second pixel,
wherein each of the first pixel and the second pixel is controlled by active matrix driving, and
wherein the third light-emitting element is controlled by passive matrix driving.

2. The electronic device according to claim 1,
wherein the first region is a light-emitting region emitting light to a photographic subject, and
wherein the second region is a display region displaying an image of the photographic subject shot by the camera.

3. An electronic device comprising:
a housing;
a camera; and
a light-emitting panel being flexible,
wherein the light-emitting panel comprises a first region and a second region,
wherein a part of the second region is provided on a first face of the housing,
wherein the camera is provided on a second face of the housing,
wherein the first face is opposite to the second face,
wherein the light-emitting panel bends so that the first region and the second region face in different directions,
wherein a part of the first region overlaps with the part of the second region,
wherein the light-emitting panel comprises a first pixel and a second pixel,
wherein the first pixel comprises a first light-emitting element,
wherein the second pixel comprises a second light-emitting element,
wherein a third light-emitting element is between the first pixel and the second pixel,
wherein each of the first pixel and the second pixel is controlled by active matrix driving, and
wherein the third light-emitting element is controlled by passive matrix driving.

4. The electronic device according to claim 3,
wherein the part of the first region is provided on the second face of the housing.

5. The electronic device according to claim 3, further comprising a light source in the second face,
wherein the camera does not overlap with the light-emitting panel.

6. The electronic device according to claim 3,
wherein the housing comprises a third face between the first face and the second face, and
wherein a part of the light-emitting panel is provided on the third face.

7. The electronic device according to claim 3,
wherein the housing has a concave portion, and
wherein the light-emitting panel is folded to fit in the concave portion.

8. The electronic device according to claim 3,
wherein the first region is a light-emitting region emitting light to a photographic subject, and
wherein the second region is a display region displaying an image of the photographic subject shot by the camera.

9. An electronic device comprising:
a camera; and
a light-emitting panel being flexible,
wherein the light-emitting panel comprises a third region including a first region and a second region, and a fourth region,
wherein the fourth region is along an edge of the third region
wherein the light-emitting panel bends so that the first region and the second region face in different directions,
wherein the camera overlaps with the light-emitting panel,
wherein the third region comprises a first pixel and a second pixel,
wherein the first pixel comprises a first light-emitting element,
wherein the second pixel comprises a second light-emitting element,
wherein a third light-emitting element is between the first pixel and the second pixel,
wherein each of the first pixel and the second pixel is controlled by active matrix driving, and
wherein the third light-emitting element is controlled by passive matrix driving.

10. The electronic device according to claim 9,
wherein the first region is a light-emitting region emitting light to a photographic subject,
wherein the second region is a display region displaying an image of the photographic subject shot by the camera, and
wherein the fourth region is a non-display region.

11. The electronic device according to claim 9,
wherein the fourth region is a light-emitting region emitting light to a photographic subject, and
wherein the third region is a display region displaying an image of the photographic subject shot by the camera.

12. The electronic device according to claim 9, wherein the fourth region comprises a fourth light-emitting element.

13. The electronic device according to claim 12, wherein the fourth light-emitting element is controlled by passive matrix driving.

14. The electronic device according to claim 12,
wherein the light-emitting panel comprises a circuit and a wiring, and
wherein the fourth light-emitting element overlaps with one or both of the circuit and the wiring.

* * * * *